Figure 1:
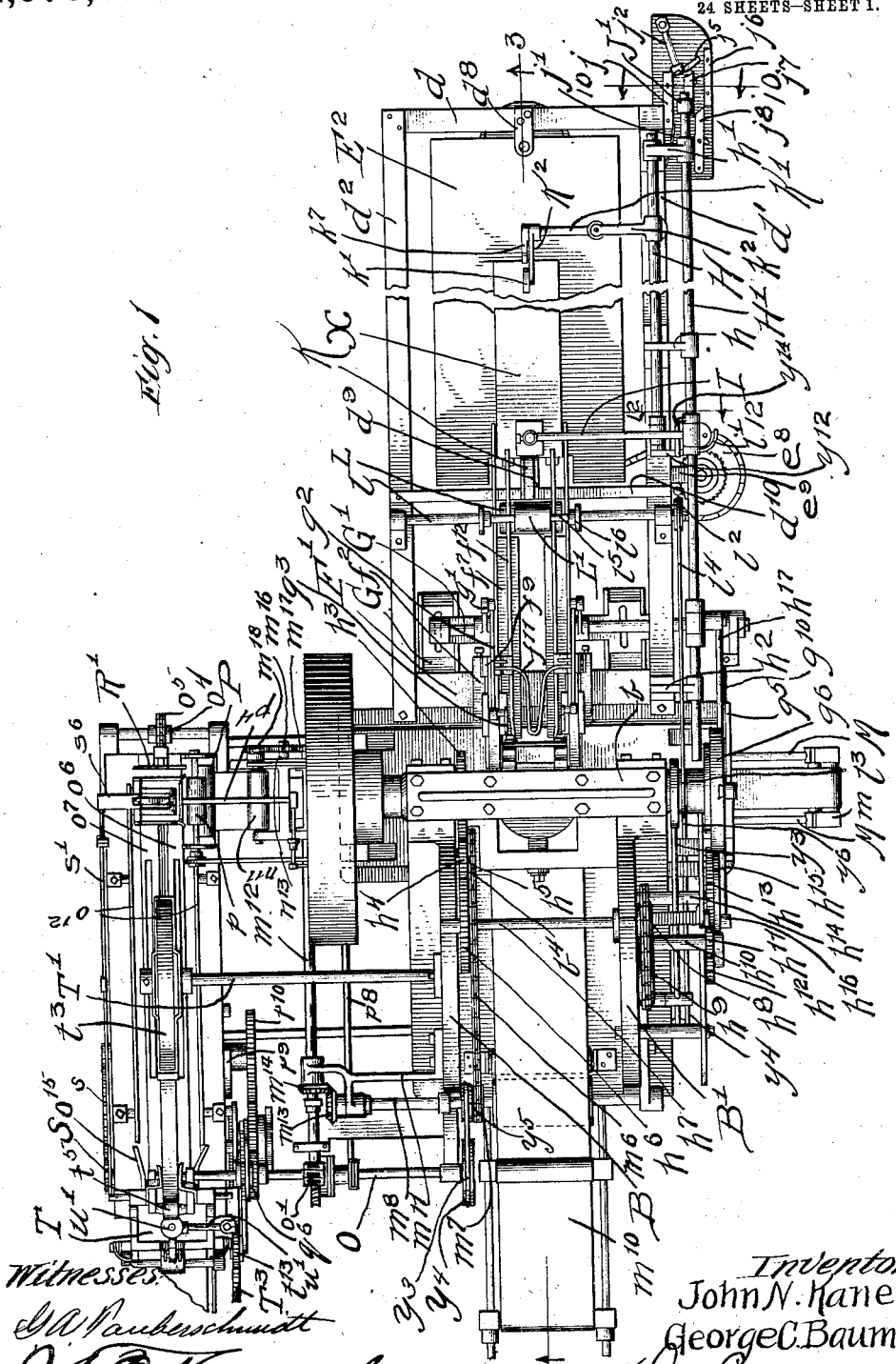

J. N. KANE & G. C. BAUMAN.
AUTOMATIC CARD CUTTING, COUNTING, AND PACKAGING MACHINE.
APPLICATION FILED DEC. 2, 1909.

1,078,291.

Patented Nov. 11, 1913.

24 SHEETS—SHEET 1.

Witnesses

Inventors
John N. Kane
George C. Bauman
By Charles W. Fries Atty.

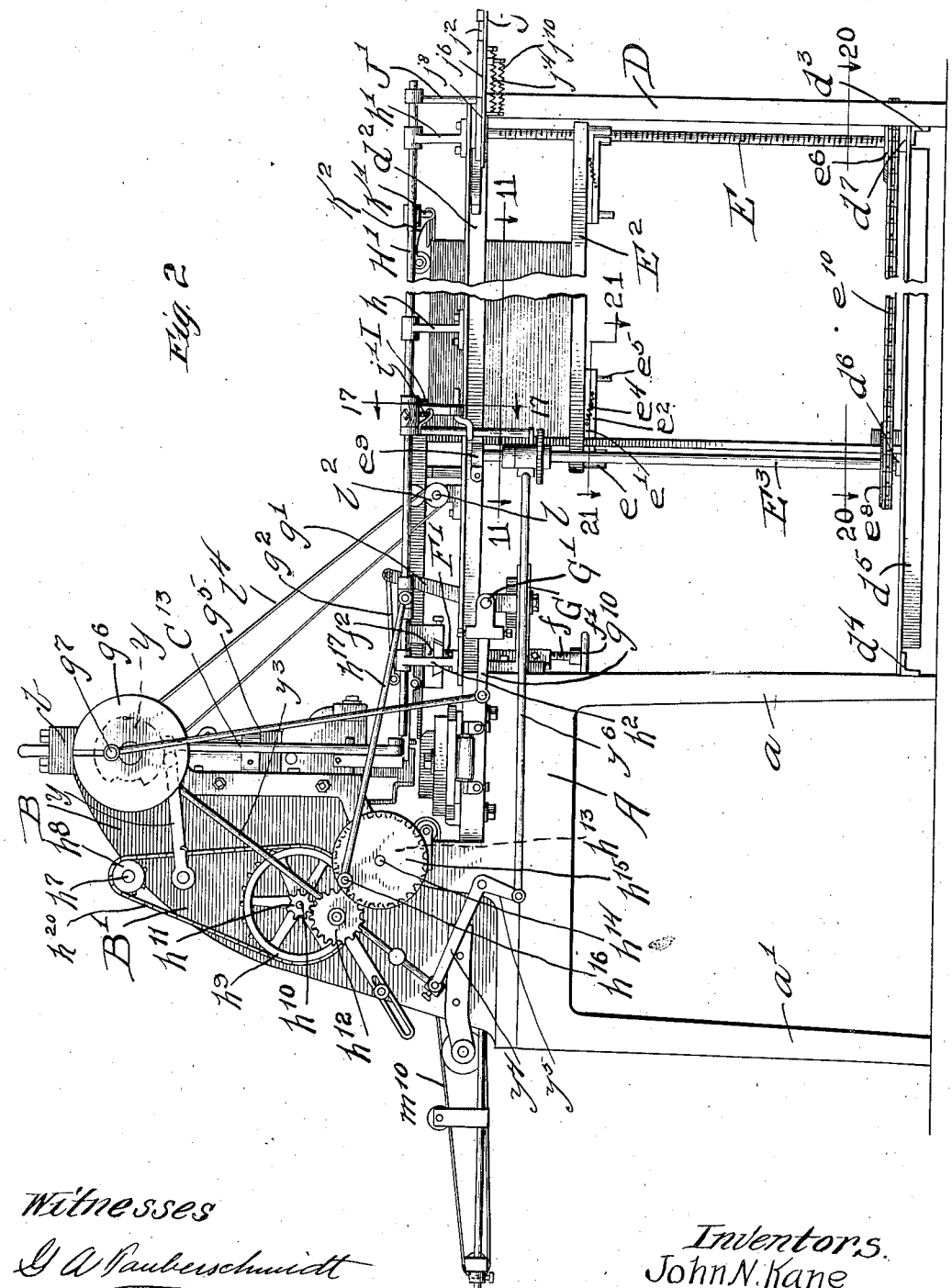

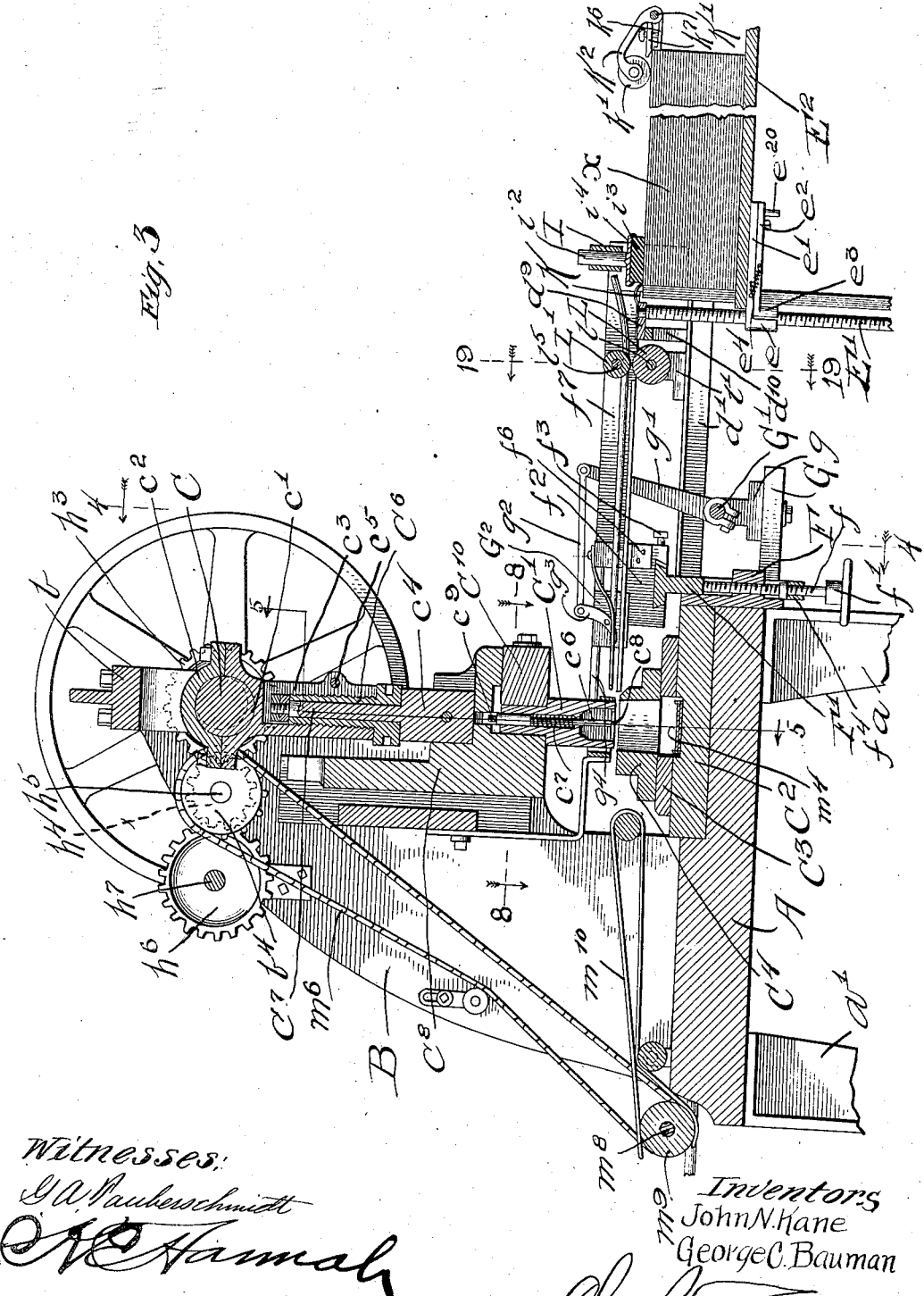

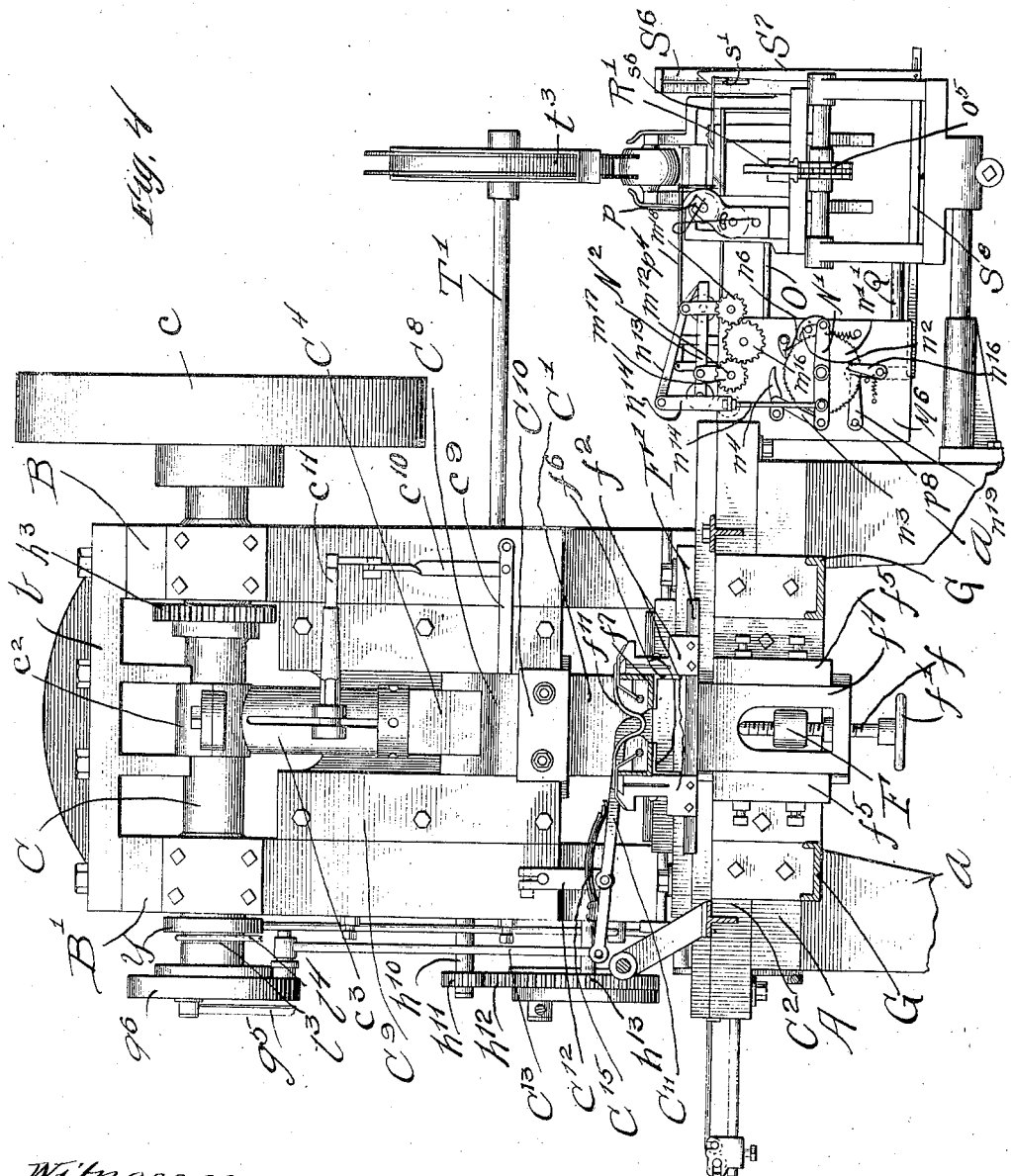

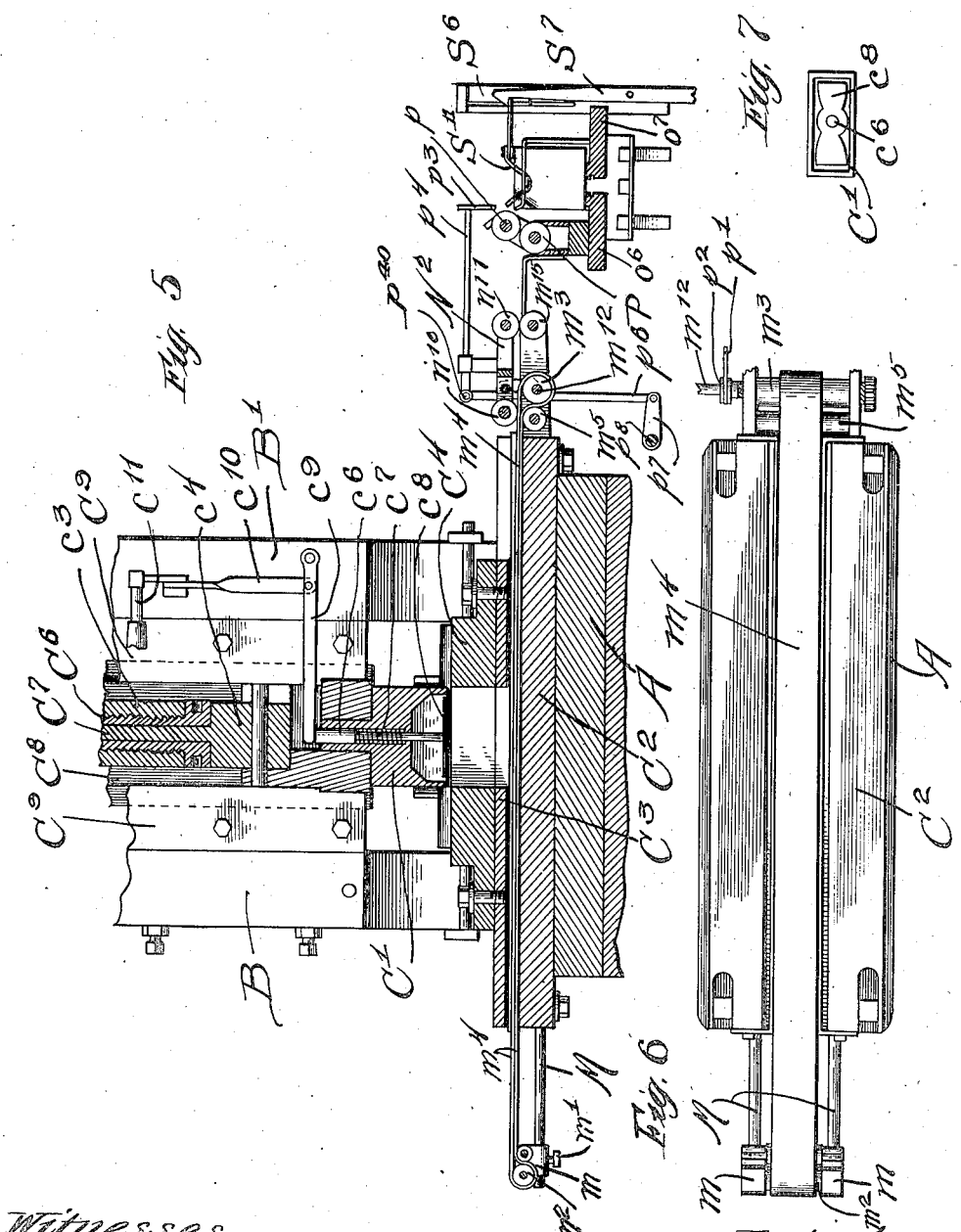

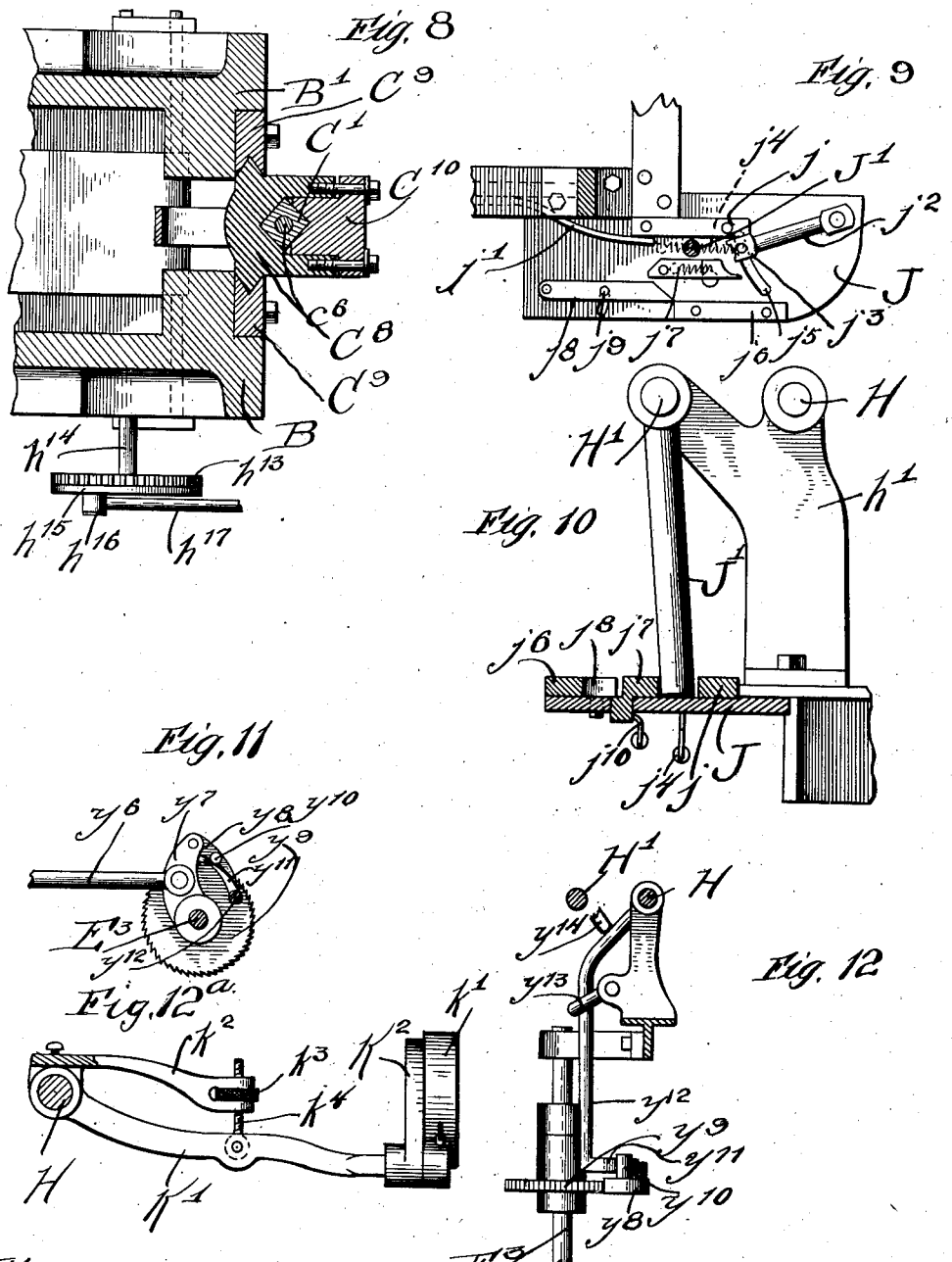

J. N. KANE & G. C. BAUMAN.
AUTOMATIC CARD CUTTING, COUNTING, AND PACKAGING MACHINE.
APPLICATION FILED DEC. 2, 1909.
1,078,291.
Patented Nov. 11, 1913.
24 SHEETS—SHEET 7.
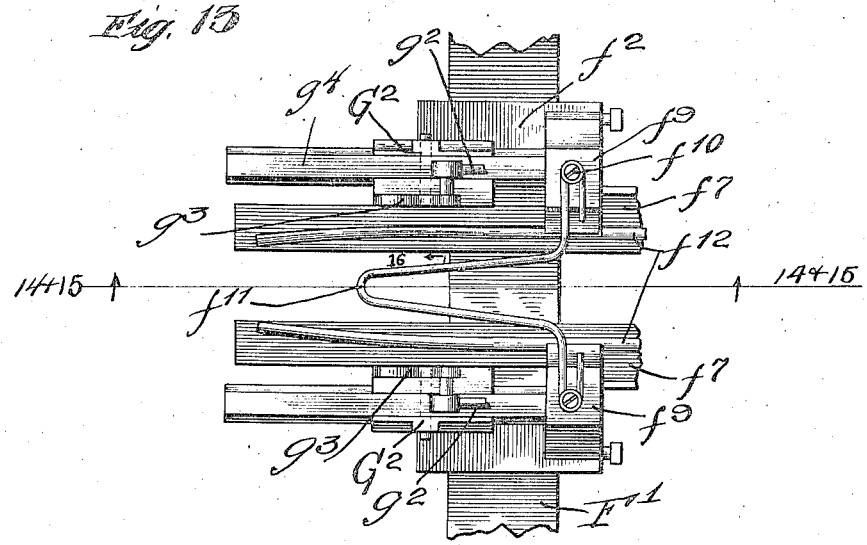
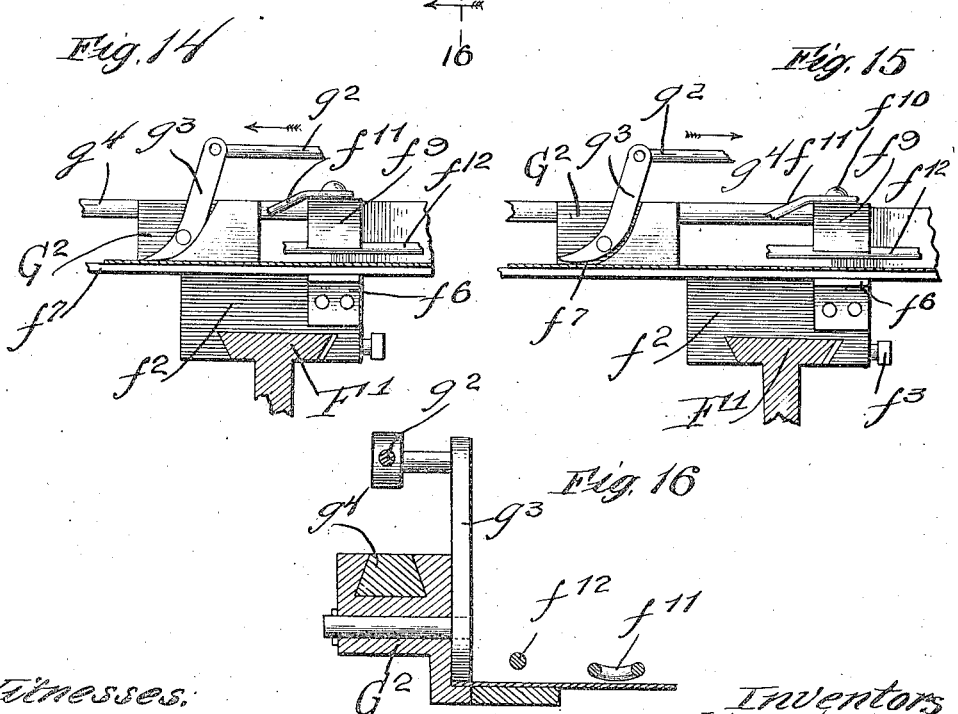
Inventors
John N. Kane
George C. Bauman.

J. N. KANE & G. C. BAUMAN.
AUTOMATIC CARD CUTTING, COUNTING, AND PACKAGING MACHINE.
APPLICATION FILED DEC. 2, 1909.
1,078,291.  Patented Nov. 11, 1913.
24 SHEETS—SHEET 8.
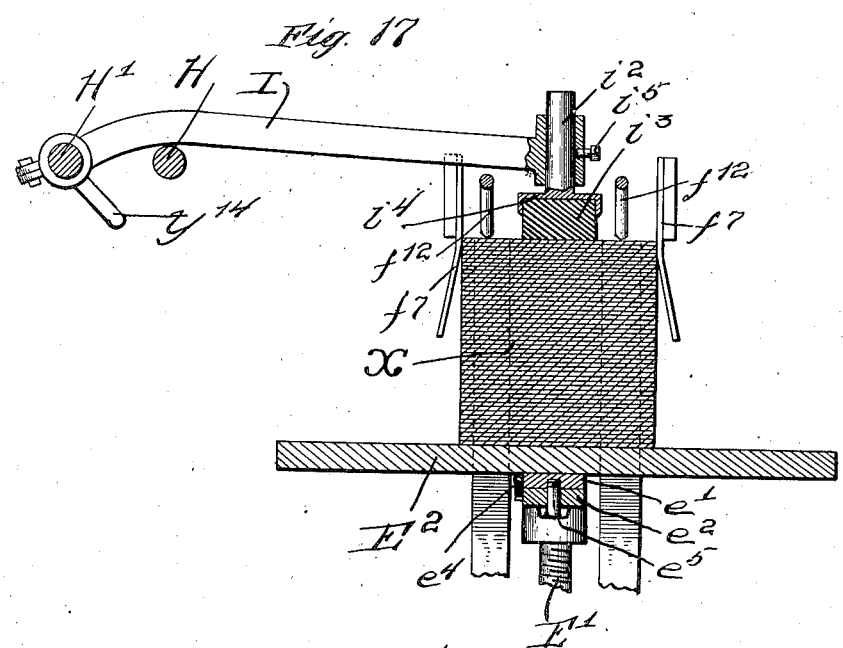
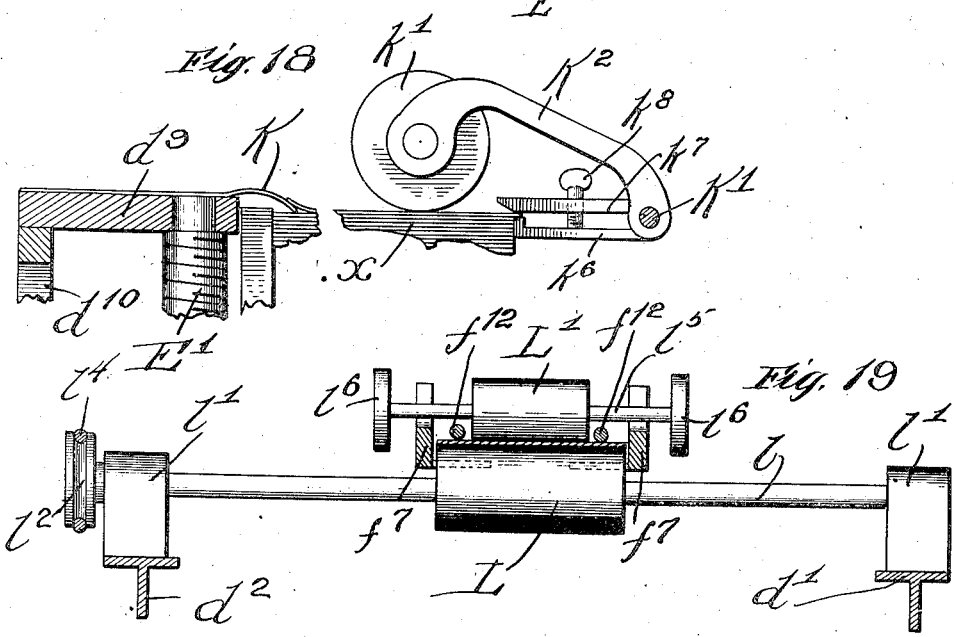

J. N. KANE & G. C. BAUMAN.
AUTOMATIC CARD CUTTING, COUNTING, AND PACKAGING MACHINE.
APPLICATION FILED DEC. 2, 1909.

1,078,291.

Patented Nov. 11, 1913.
24 SHEETS—SHEET 9.

Witnesses:

Inventors
John N Kane
George C. Bauman.
By Charles ◯◯◯ Atty.

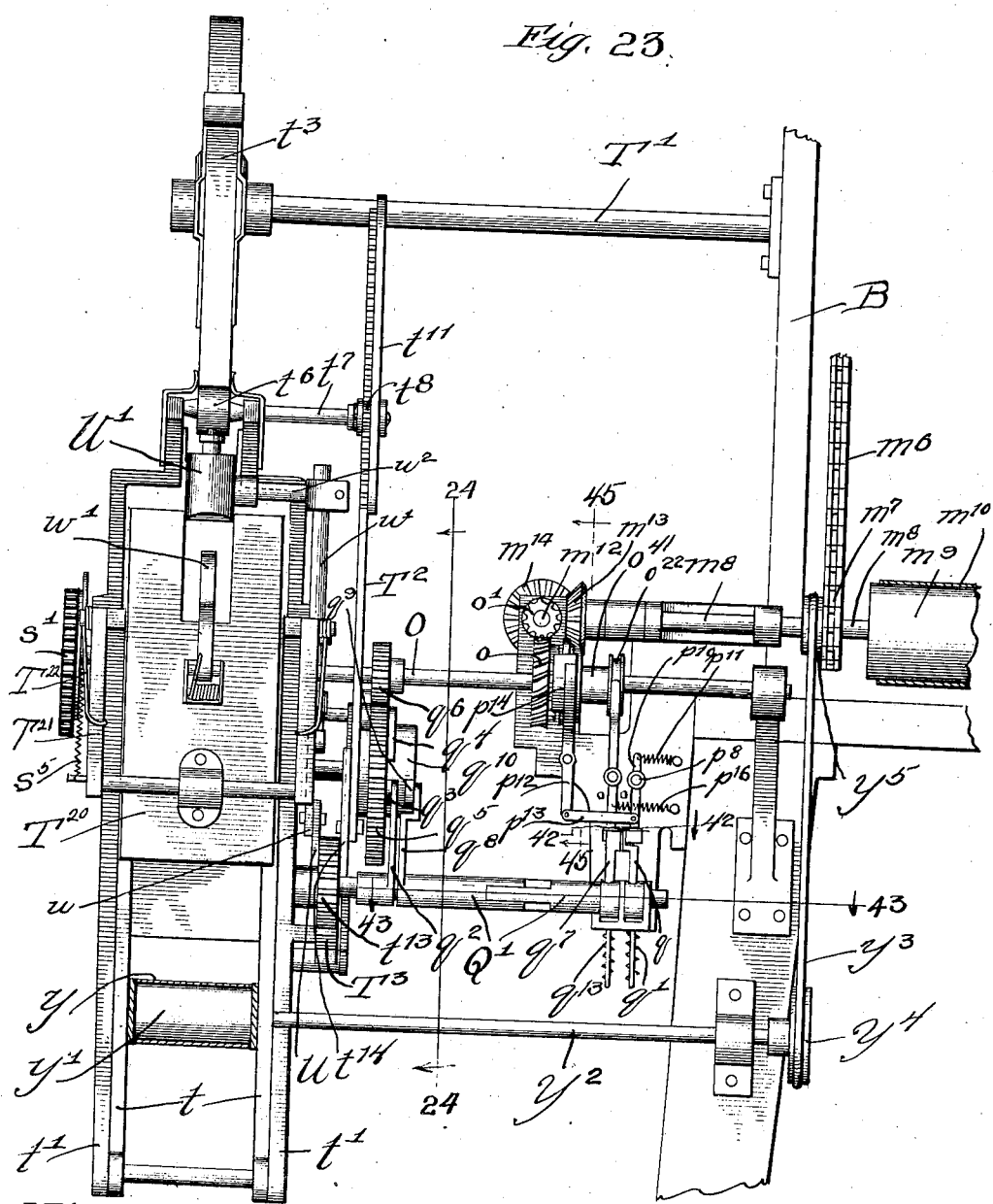

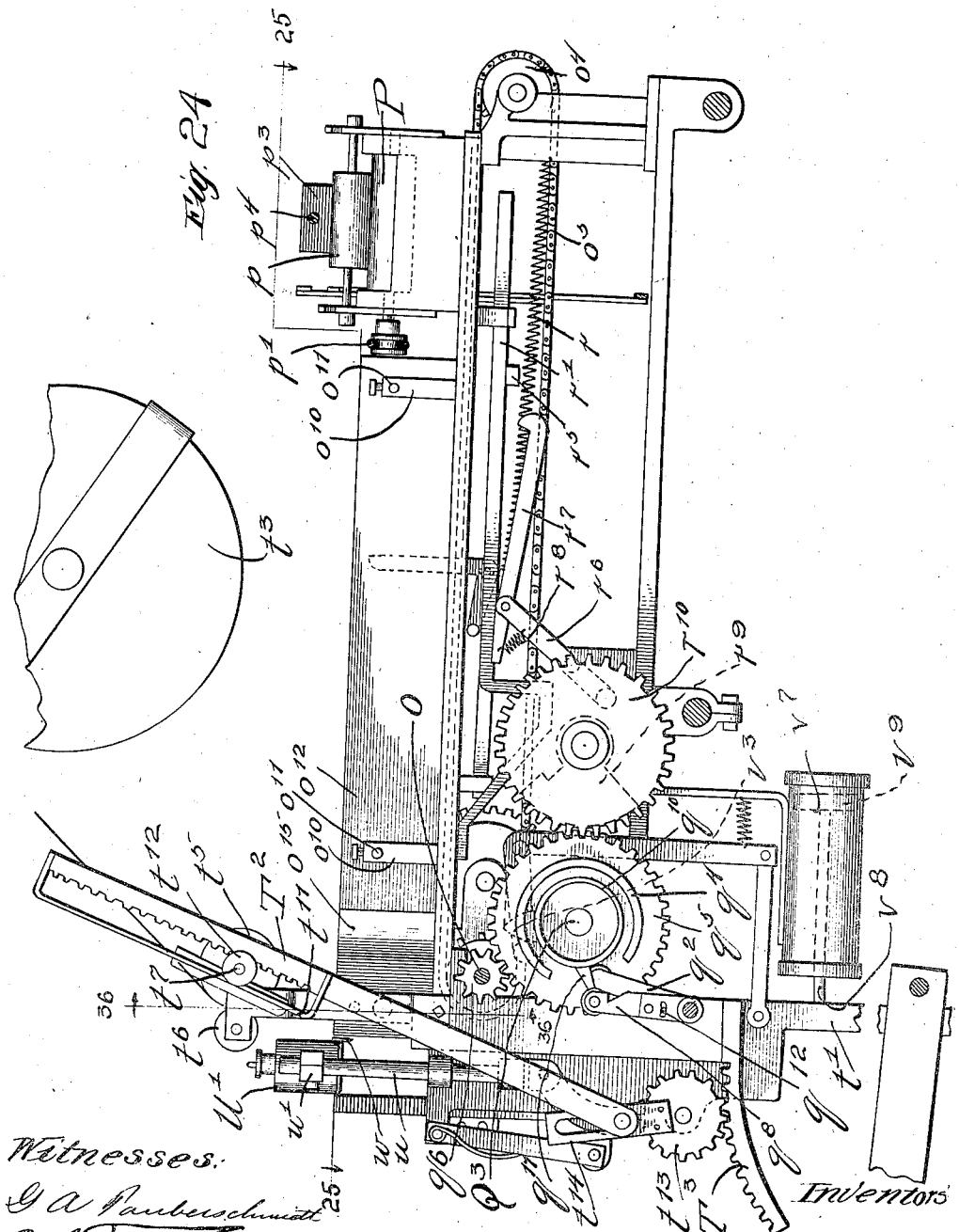

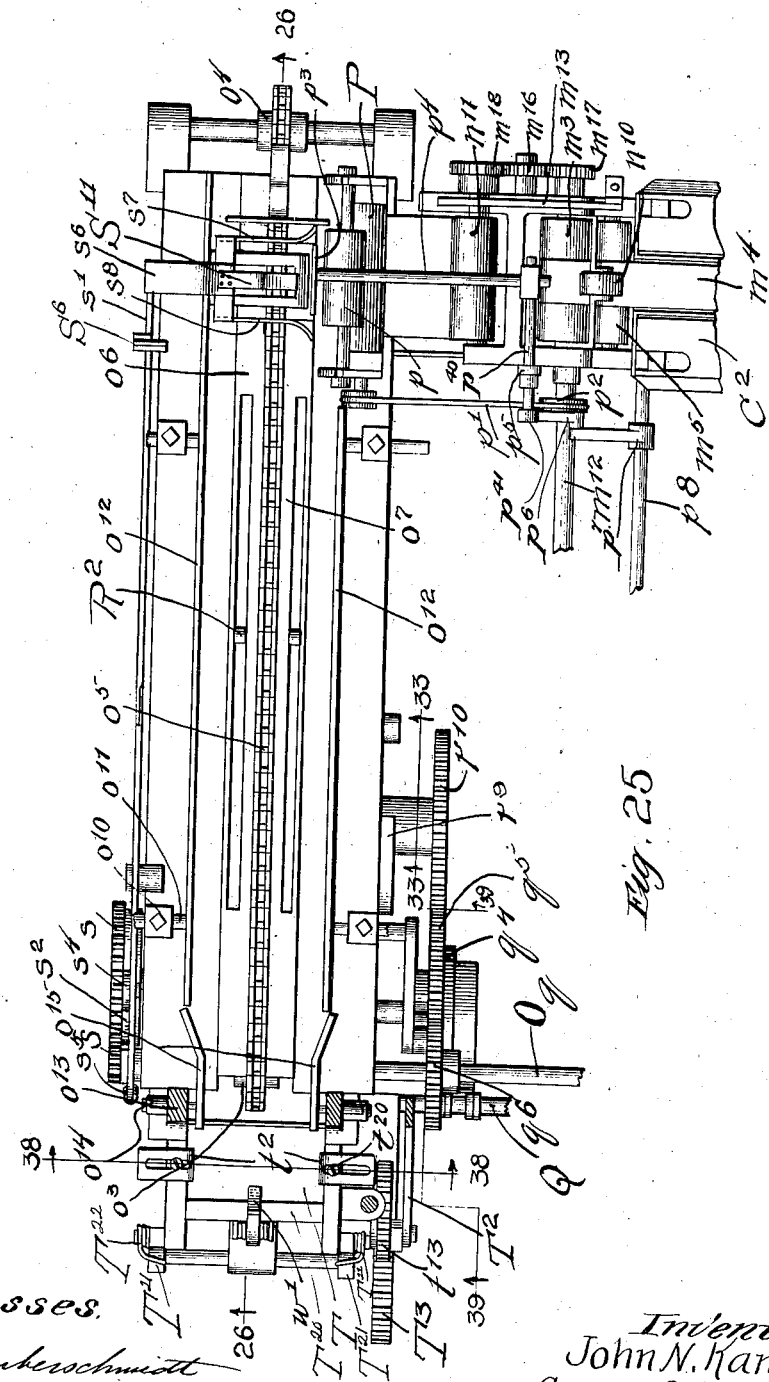

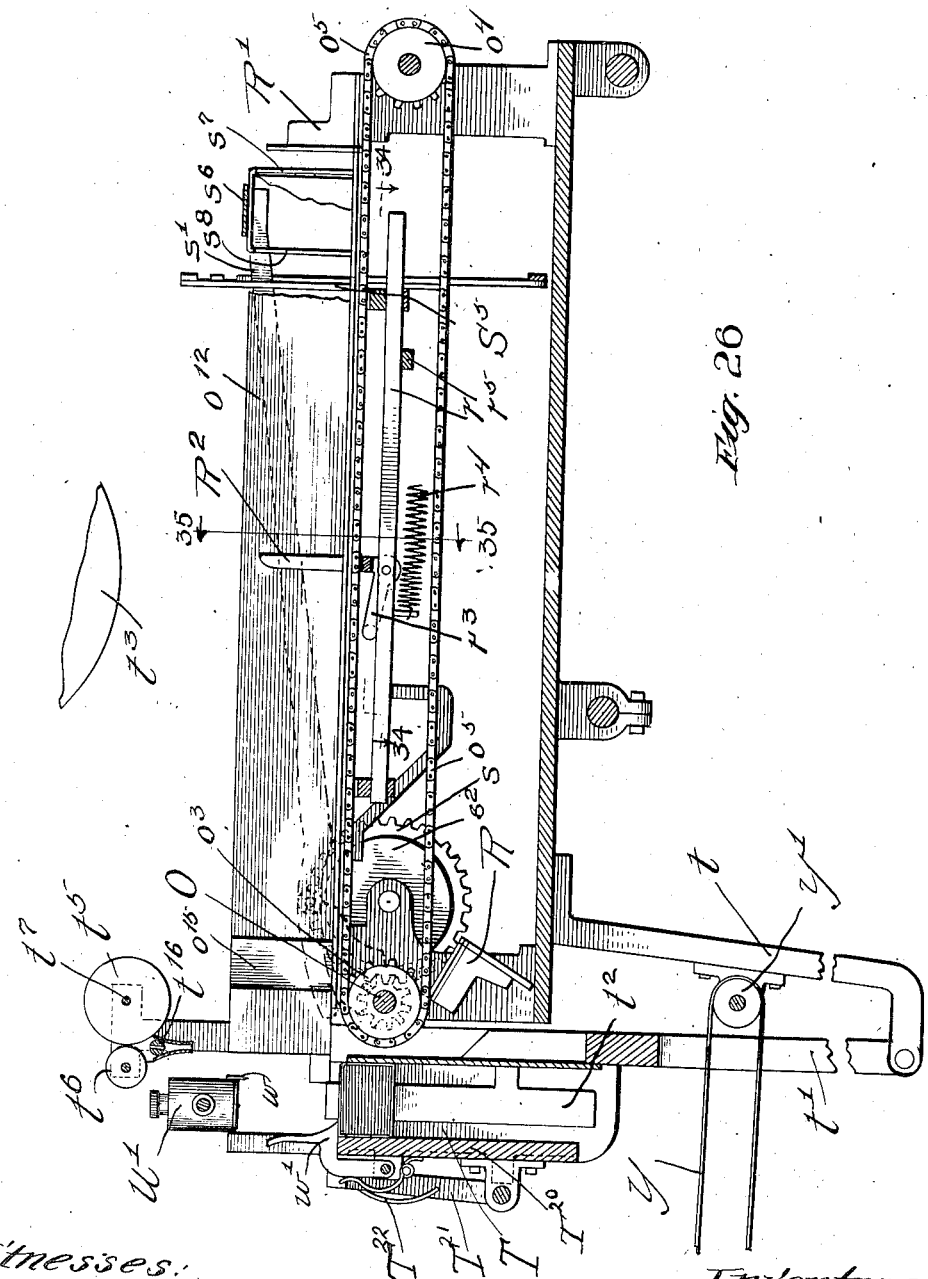

J. N. KANE & G. C. BAUMAN.
AUTOMATIC CARD CUTTING, COUNTING, AND PACKAGING MACHINE.
APPLICATION FILED DEC. 2, 1909.
1,078,291.
Patented Nov. 11, 1913.
24 SHEETS—SHEET 14.
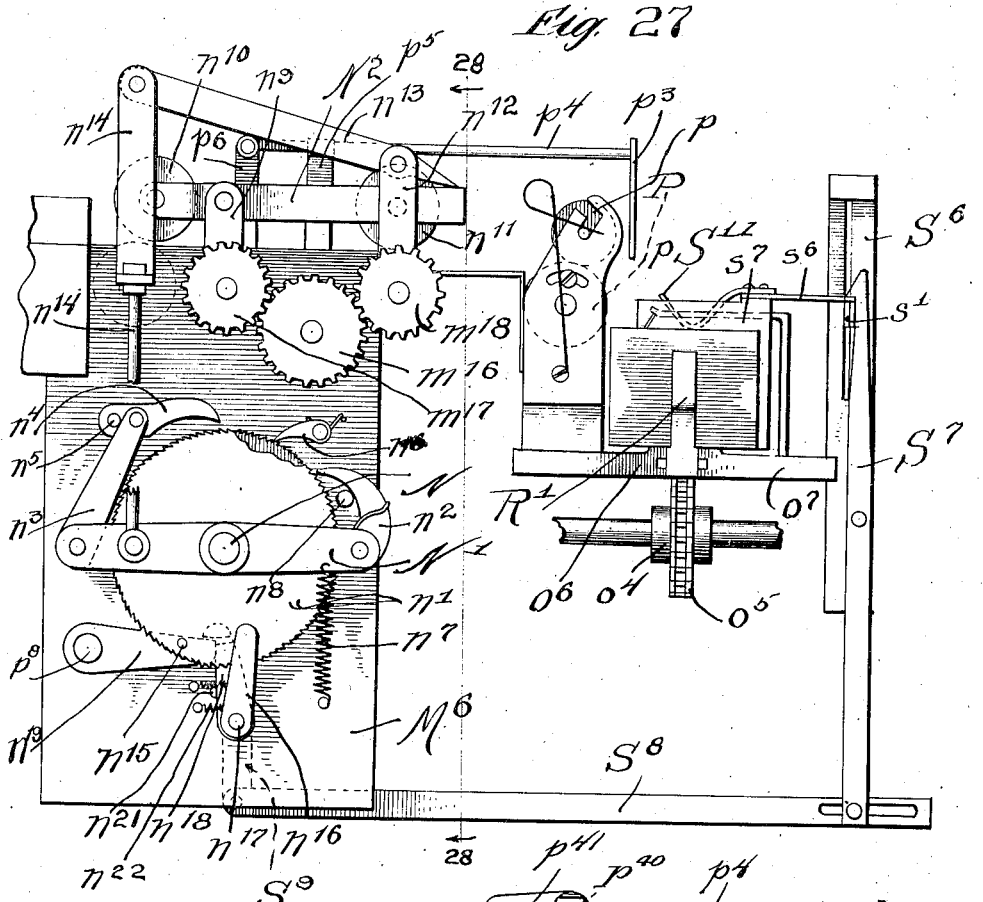
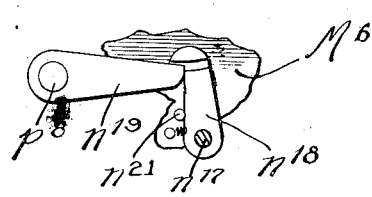
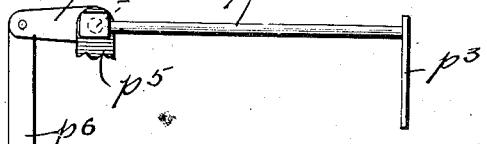
Witnesses:
Inventors
John N. Kane
George C. Bauman
By Charles W. Fies
Atty.

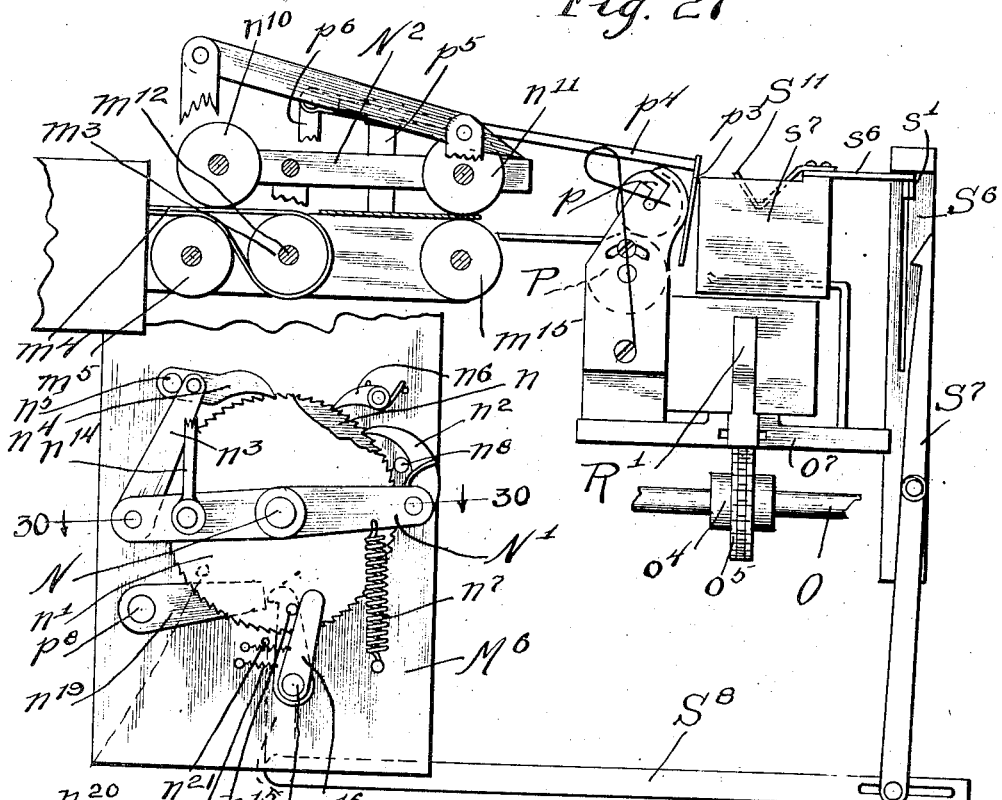
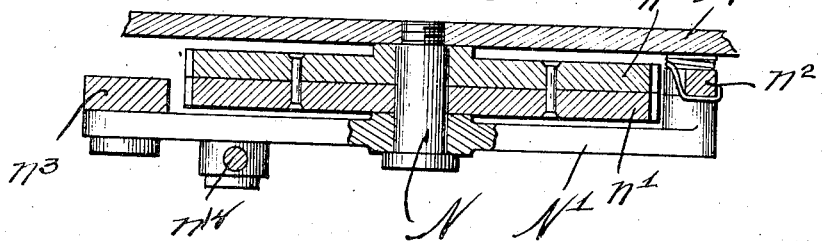

J. N. KANE & G. C. BAUMAN.
AUTOMATIC CARD CUTTING, COUNTING, AND PACKAGING MACHINE.
APPLICATION FILED DEC. 2, 1909.
1,078,291.
Patented Nov. 11, 1913.
24 SHEETS—SHEET 16.
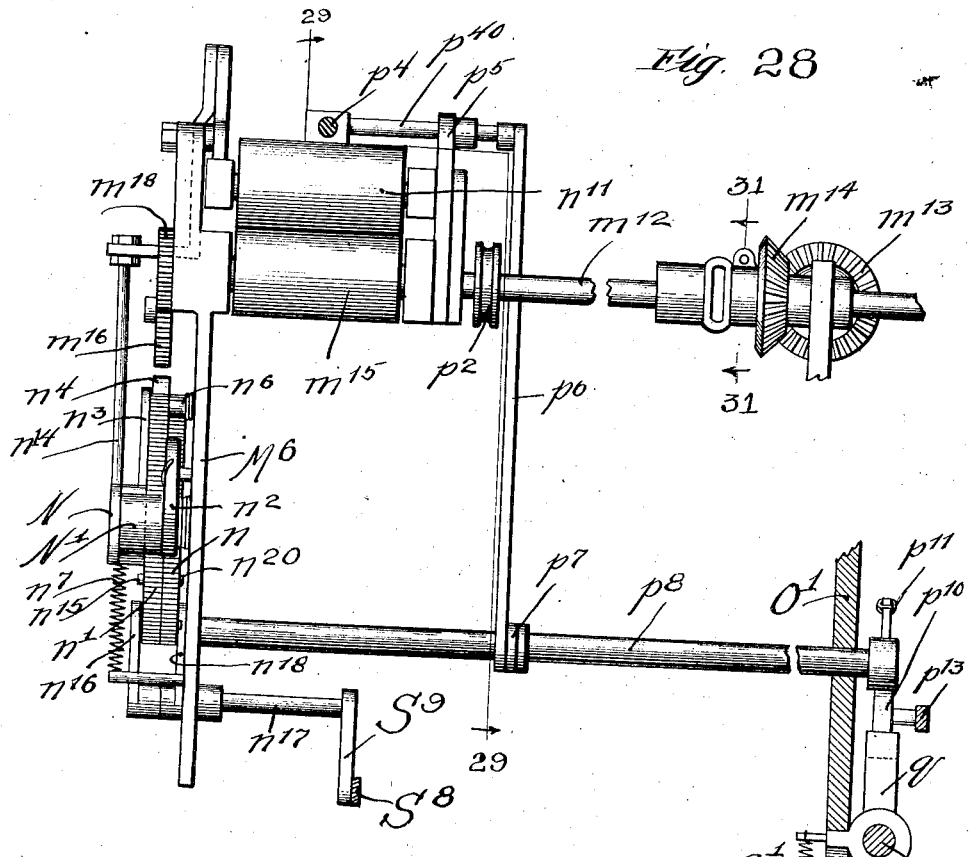
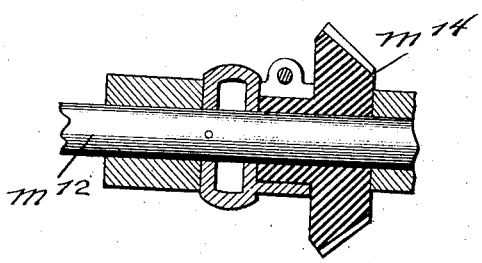
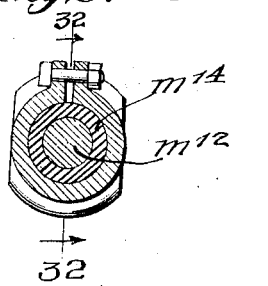
Witnesses:
Inventors
John N. Kane
George C. Bauman
By Charles W. Neesy Atty.

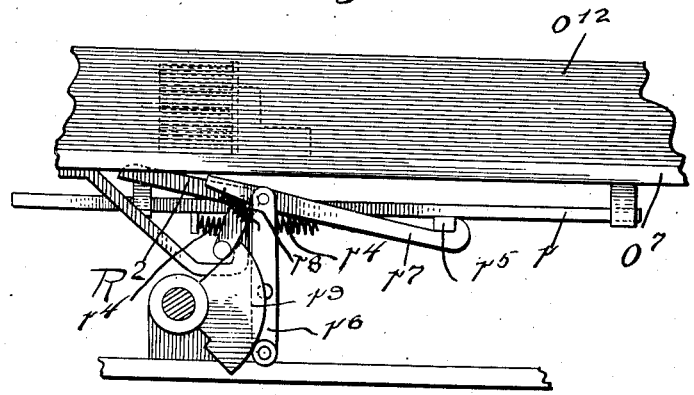
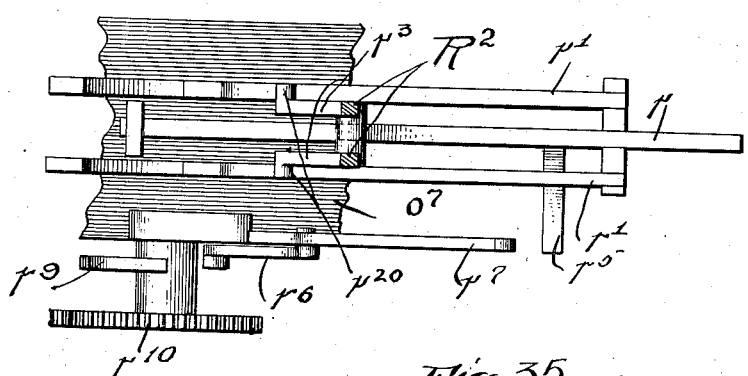
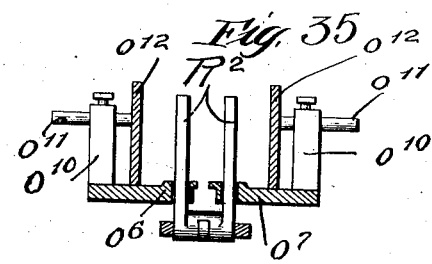

J. N. KANE & G. C. BAUMAN.
AUTOMATIC CARD CUTTING, COUNTING, AND PACKAGING MACHINE.
APPLICATION FILED DEC. 2, 1909.
1,078,291.
Patented Nov. 11, 1913.
24 SHEETS—SHEET 18.
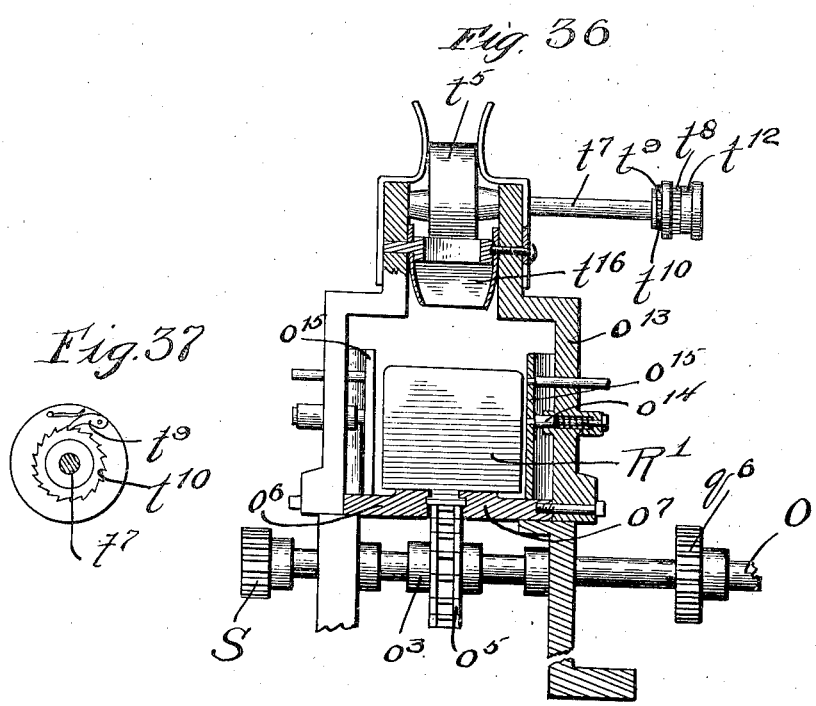
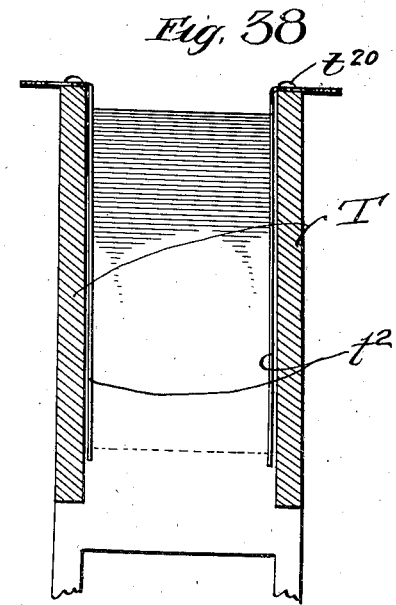
Witnesses:
Inventors
John N. Kane
George C. Bauman.
By Charles Devries
Atty.

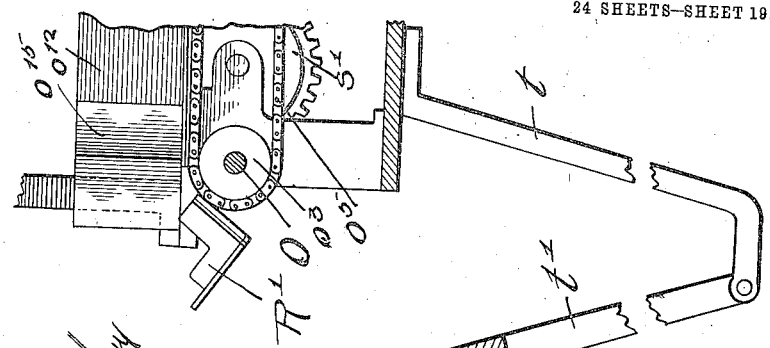
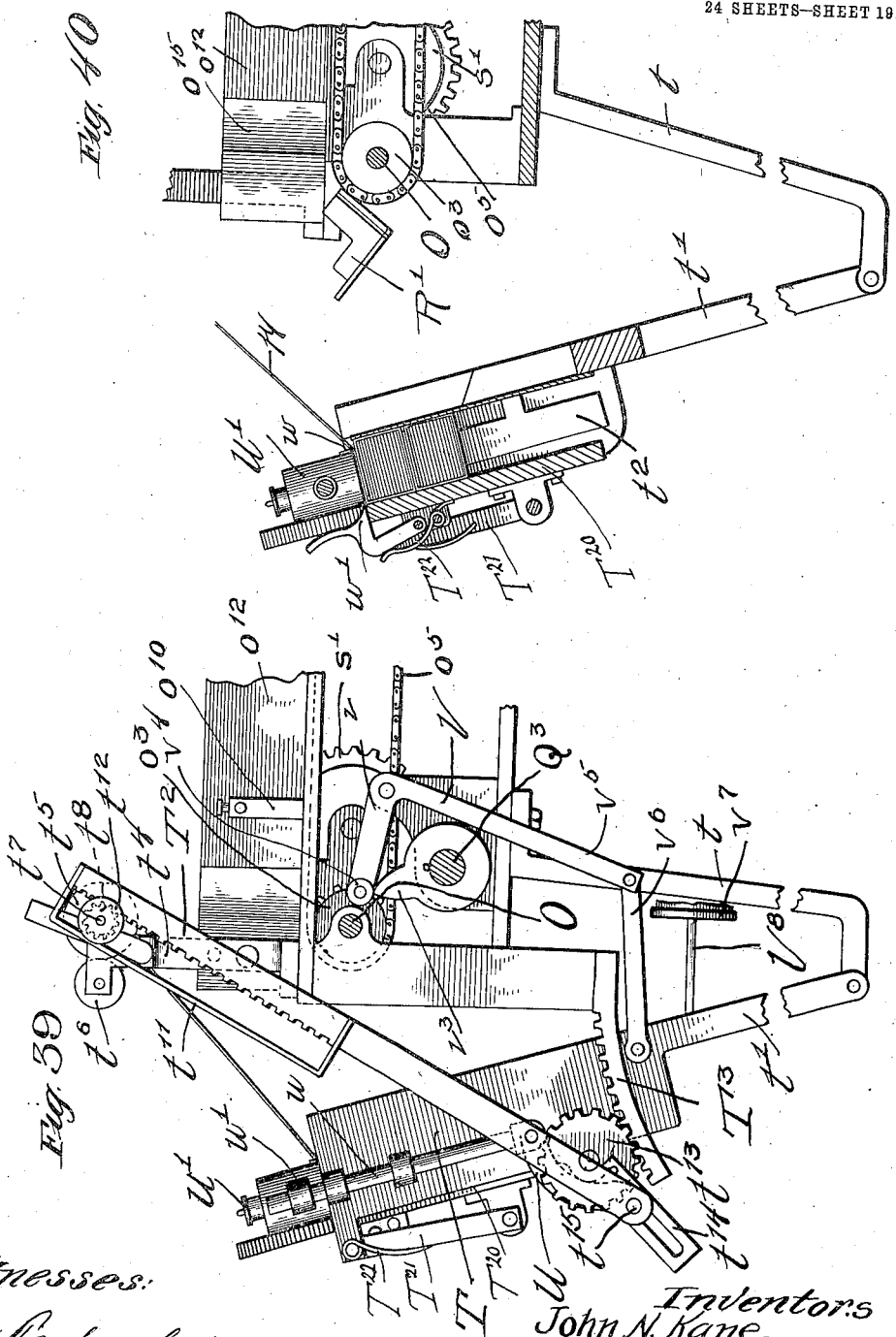

J. N. KANE & G. C. BAUMAN.
AUTOMATIC CARD CUTTING, COUNTING, AND PACKAGING MACHINE.
APPLICATION FILED DEC. 2, 1909.
1,078,291.
Patented Nov. 11, 1913.
24 SHEETS—SHEET 20.
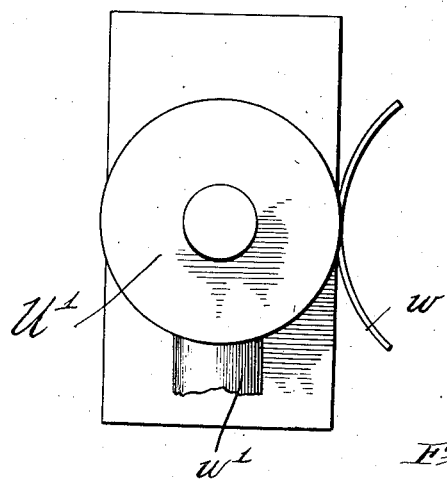
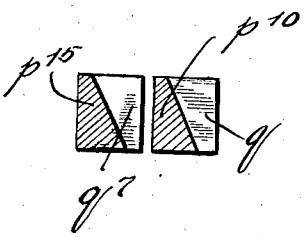
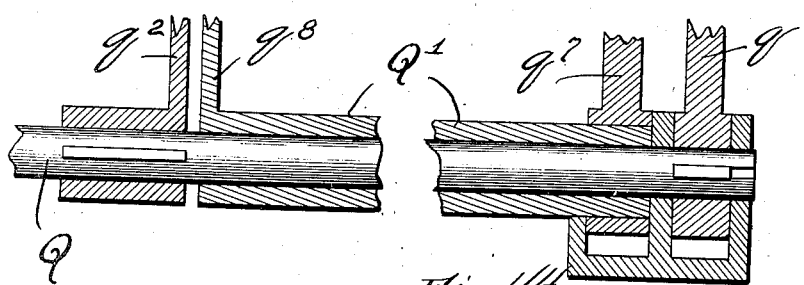
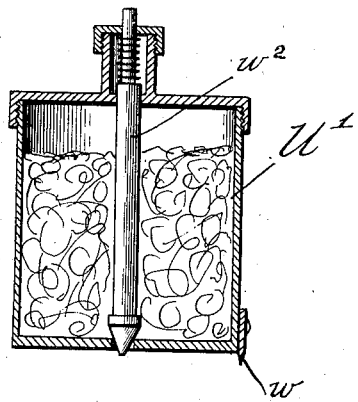
Witnesses:
Inventors
John N. Kane
George C. Bauman.
By Charles O. Niles Atty.

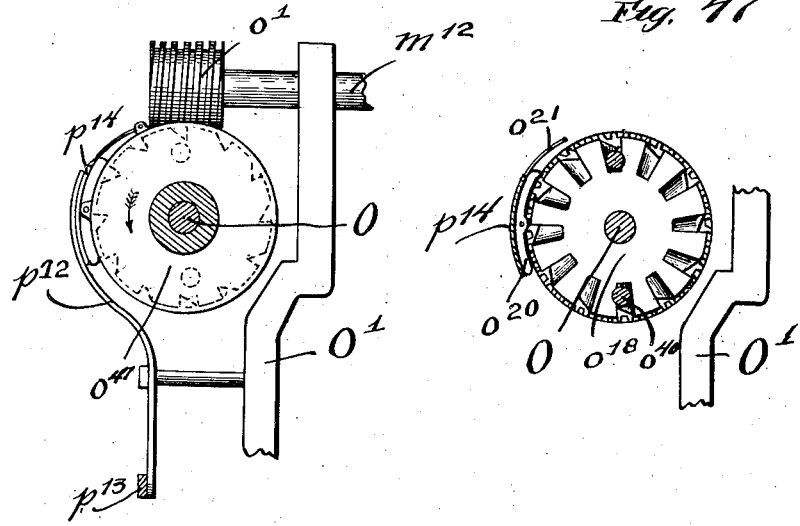
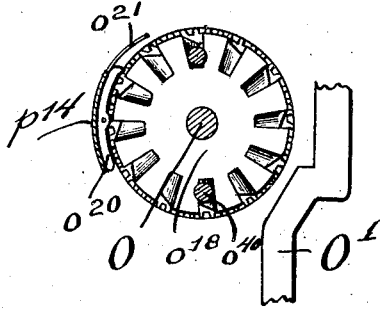
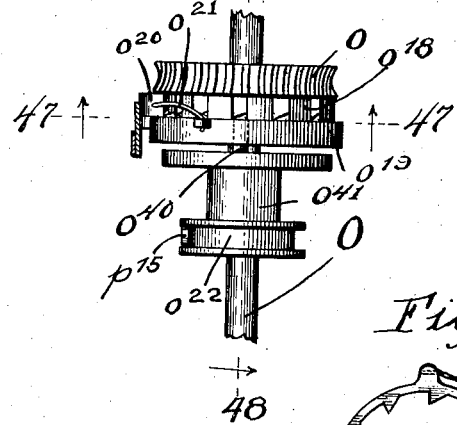
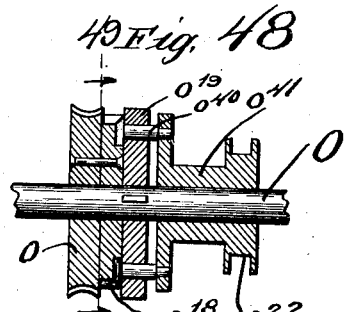
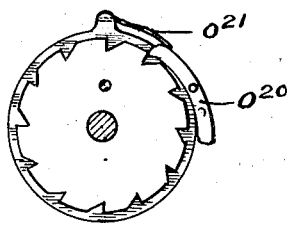

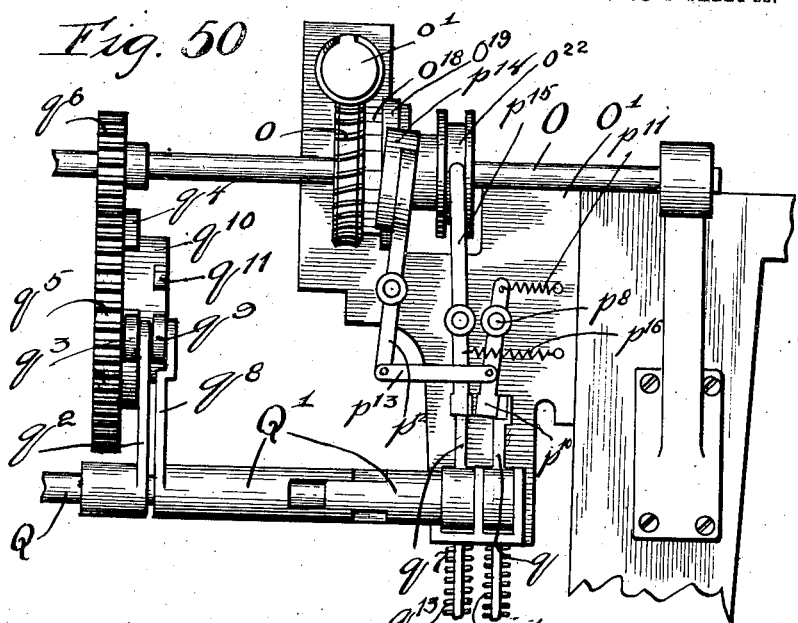
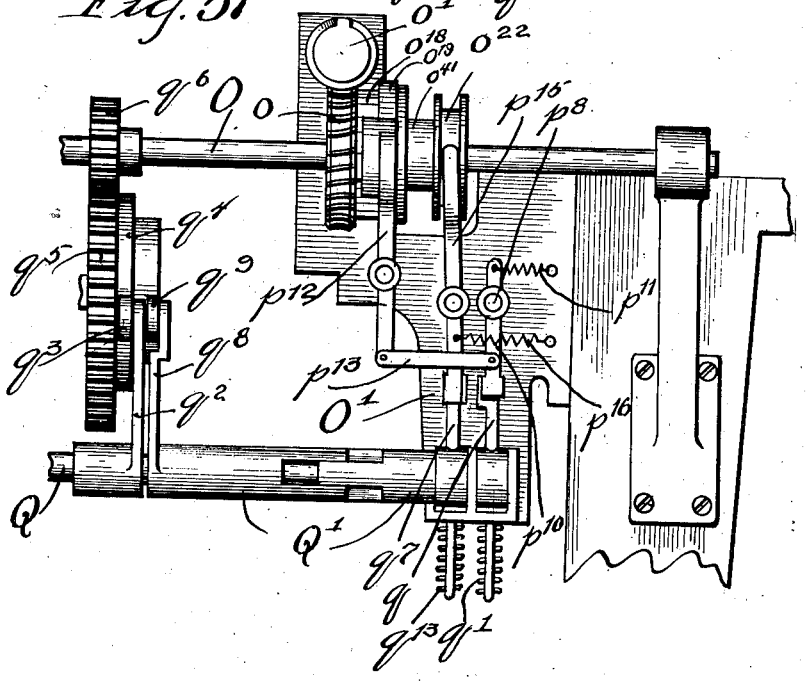

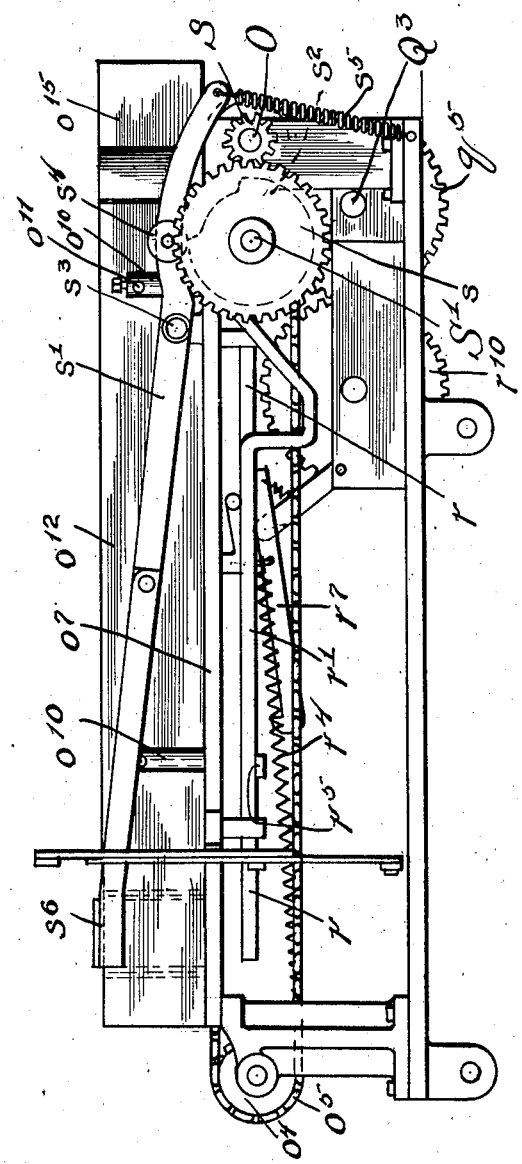

J. N. KANE & G. C. BAUMAN.
AUTOMATIC CARD CUTTING, COUNTING, AND PACKAGING MACHINE.
APPLICATION FILED DEC. 2, 1909.
1,078,291.
Patented Nov. 11, 1913.
24 SHEETS—SHEET 24.
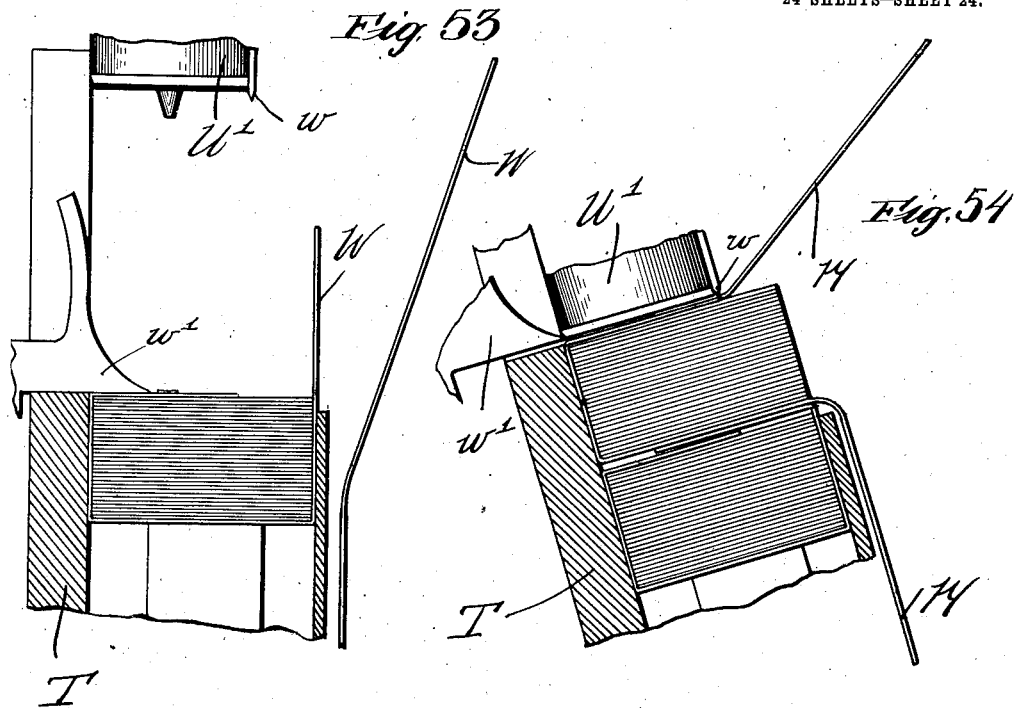
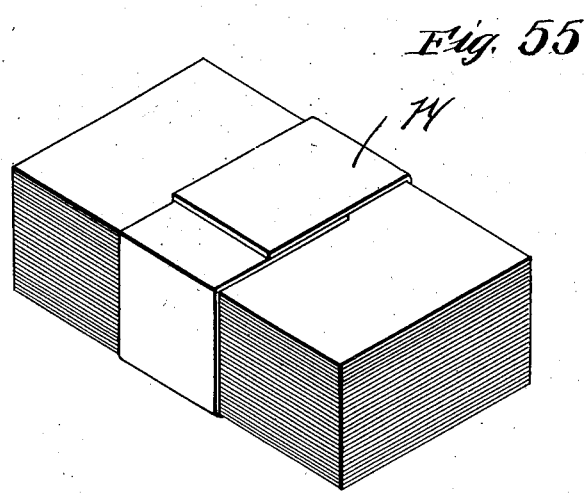
Witnesses:
Inventors
John N. Kane
George C. Bauman.

UNITED STATES PATENT OFFICE.

JOHN N. KANE AND GEORGE C. BAUMAN, OF CHICAGO, ILLINOIS; SAID KANE ASSIGNOR TO MOSER PAPER CO., OF CHICAGO, ILLINOIS, A CORPORATION OF ILLINOIS.

AUTOMATIC CARD CUTTING, COUNTING, AND PACKAGING MACHINE.

1,078,291.     Specification of Letters Patent.     Patented Nov. 11, 1913.

Application filed December 2, 1909. Serial No. 531,110.

*To all whom it may concern:*

Be it known that we, JOHN N. KANE and GEORGE C. BAUMAN, citizens of the United States, and residents of the city of Chicago, in the county of Cook and State of Illinois, have invented certain new and useful Improvements in Automatic Card Cutting, Counting, and Packaging Machines; and we do hereby declare that the following is a full, clear, and exact description of the same, reference being had to the accompanying drawings, and to the letters of reference marked thereon, which form a part of this specification.

Business and visiting cards have heretofore usually been cut on ordinary cutters such as used in printing offices and usually by stacking a number of sheets of the bristol or other board from which the cards are to be cut, and then cutting the same into strips through the entire pack for the width of the card, and then cutting the packs transversely for the length of the card. Frequently such cuts of cards are not exactly rectangular in form, owing to the failure of the operator setting his gage accurately and furthermore, owing to the amount of handling necessary the operation is necessarily slow and consequently expensive. In the larger establishments wherein large quantities of cards are cut annually sometimes dies are used, but in those instances the cards must be collected, counted and wrapped in packages manually, and this necessitates the employment of numerous helpers, usually girls and boys, frequently as many as ten or twelve to a single machine, thus entailing a large expense for the handling of the cards after they are cut. Enormous quantities of such cards are cut every year and houses engaged in this manufacture have found that the die presses necessary to accomplish the work together with the number of employees required necessitates the use of a large amount of floor space, thus in the past adding considerably to the price of the cards because of the rental of such space.

The object of this invention is to provide an automatic machine adapted to receive the card-board of whatsoever thickness and cut to approximately the desired width in stacks to fit the same to the cutting dies, to count the cards as they are cut, to package and wrap the same with a retaining band and to deliver the same from the machine in packs ready for boxing and shipment.

It is a further object of the invention to perform mechanically and automatically in connection with a machine such as described, the operation of cutting and packaging and to afford mechanism for discharging the counted and wrapped pack after closing the wrapper.

It is a further object of the invention to afford an automatically operating machine adapted to feed the stack of strips upwardly to the feed table gradually and at a rate corresponding with the rate of delivery of the card strips therefrom, thus insuring that a strip of the cardboard shall be in position to feed to the dies immediately following the strip last cut and to afford automatic feeding mechanism in connection therewith whereby the operation of the machine is made continuous.

It is a further object of the invention to afford a machine of such simple construction as to enable a single expert employee to operate from four to ten of the same without other assistance than merely to place the wrapped packages in boxes for shipment.

The invention embraces many novel features and consists in the matters hereinafter described and more fully pointed out and defined in the appended claims.

Figure 20:
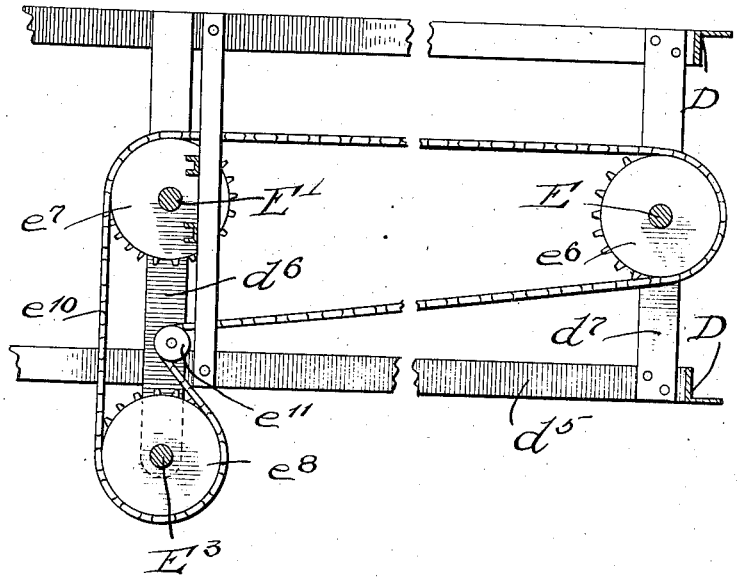
Figure 21:
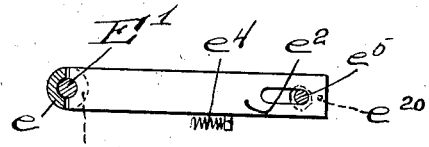
Figure 22:
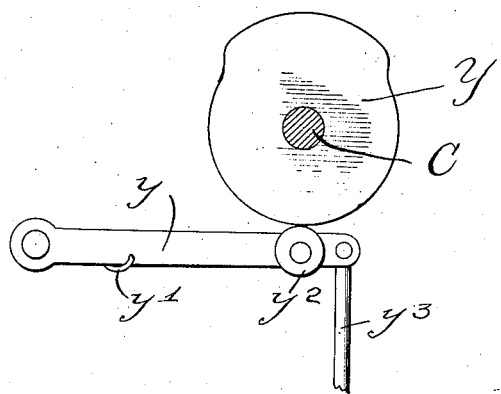

In the drawings: Figure 1 is a top plan view of a device embodying our invention with parts omitted and partly broken. Fig. 2 is a side elevation thereof partly broken. Fig. 3 is an enlarged section taken on line 3—3 of Fig. 1, with parts omitted and broken away. Fig. 4 is a section taken on line 4—4 of Fig. 3. Fig. 5 is a section taken on line 5—5 of Fig. 3. Fig. 6 is a top plan view of the transverse carrier to the counting mechanism. Fig. 7 is an inverted plan view of the die and the head of the plunger for pushing out the cut card. Fig. 8 is a fragmentary section taken on line 8—8 of Fig. 3. Fig. 9 is an enlarged plan view of the cam shifting mechanism for the strip feed. Fig. 10 is an enlarged section taken on line 10—10 of Fig. 1. Fig. 11 is an enlarged section taken on line 11—11 of Fig. 2, with parts omitted. Fig. 12 is another view thereof taken on line 12—12 of Fig. 1. Fig. 12ª is a front elevation of the feeder for the card strips. Fig. 13 is an enlarged top plan view of the inner end of the feed table delivering to the die, with parts broken away. Figs. 14 and 15, are sections taken on line 14 and 15, of Fig. 13, and illustrate a part of the strip feeding mechanism on said feed table. Fig. 16 is a section taken on line 16—16 of Fig. 13 with parts omitted. Fig. 17 is a section taken on line 17—17 of Fig. 2. Fig. 18 is an enlarged fragmentary top plan view partly in section of a part of the strip feeding mechanism. Fig. 19 is an enlarged section taken on line 19—19 of Fig. 3. Fig. 20 is an enlarged section taken on line 20—20 of Fig. 2. Fig. 21 is an enlarged section taken on line 21—21 of Fig. 2. Fig. 22 is an enlarged detail of the cam and follower for actuating a part of the strip feed. Fig. 23 is an enlarged fragmentary detail in rear elevation with parts omitted, of the assembling and wrapping mechanism. Fig. 24 is an enlarged section on line 24—24 of Fig. 23. Fig. 25 is a top plan view partly in section on line 25—25 of Fig. 24, of the assembling and wrapping mechanism. Fig. 26 is a section taken on line 26—26 of Fig. 25. Figs. 27, 27[a] and 27[B], are front elevations broken and with parts omitted and details of the counting, assembling and wrapping mechanism. Fig. 28 is a section taken on line 28—28 of Fig. 27 with parts omitted. Fig. 29 is a section taken on line 29—29 of Fig. 28, with parts omitted. Fig. 30 is an enlarged section on line 30—30 of Fig. 27[a]. Fig. 31 is an enlarged section taken on line 31—31 of Fig. 28. Fig. 32 is a section taken on line 32—32 of Fig. 31. Fig. 33 is a fragmentary section taken on line 33—33 of Fig. 25. Fig. 34 is a fragmentary section taken on line 34—34 of Fig. 26. Fig. 35 is a section taken on line 35—35 of Fig. 26. Fig. 36 is a section taken on line 36—36 of Fig. 24. Fig. 37 is a detail of the pawl and ratchet used in connection with the wrapper feed mechanism. Fig. 38 is a section taken on line 38—38 of Fig. 25. Fig. 39 is a section taken on line 39—39 of Fig. 25. Fig. 40 is a central section taken through the packaging and wrapping mechanism and in a plane parallel with the section shown in Fig. 39. Fig. 41 is an enlarged top plan view of the paste pot and parts connected therewith. Fig. 42 is a section taken on line 42—42 of Fig. 23, with parts omitted. Fig. 43 is a section taken on line 43—43 of Fig. 23, with parts omitted and broken away. Fig. 44 is a vertical section taken through the paste pot. Fig. 45 is an enlarged section on line 45—45 of Fig. 23, with parts omitted. Fig. 46 is a top plan view of the worm gear and connected parts shown in Fig. 45, with the worm omitted. Fig. 47 is a section on line 47—47 of Fig. 46. Fig. 48 is a section on line 48—48 of Fig. 46. Fig. 49 is a section on line 49—49 of Fig. 48. Fig. 50 is an enlarged view in rear elevation of a shifting and clutch mechanism shown in Figs. 23 and 45, to 49 inclusive, showing the same in one position. Fig. 51 is a similar view showing the same in shifted position. Fig. 52 is an enlarged side elevation of the packaging conveyer with parts omitted. Fig. 53 is an enlarged central vertical section taken through the packaging chute and showing the package in position to receive another package on the top thereof. Fig. 54 is a similar view showing the second package imposed upon the first. Fig. 55 is a perspective view of the counted and sealed package.

As shown in the drawings: the machine comprises a power operated die for cutting the cards, automatic mechanism for feeding the strips upwardly to the feed table, and thence to the die; automatic means for delivering the cut cards transversely of the machine and counting the same during their travel, mechanism for assembling the cards and mechanism for securing a band about the cards in packages of a predetermined number.

Referring first to the power die, A, indicates the table or frame having legs $a$—$a^1$, and having rigidly bolted on the top of the table the upwardly directed, parallel brackets B—B$^1$, which curve upwardly and forwardly from the rear side of the table and the front sides thereof afford vertical faces or plates. Said brackets are connected across the top by means of a beam $b$, bolted to each and journaled in said brackets near the top thereof is a transverse shaft C, having on its outer end a driving pulley adapted to be engaged by a belt from any source of power. An eccentric $c^1$, is provided on the shaft C, and journaled thereon is an eccentric yoke $c^2$. An internally threaded member $c^3$, bifurcated longitudinally extends downwardly from the strap $c^2$, and an adjusting stem $C^6$, is threaded therein which is provided with a head beneath the bottom of the member $c^3$, for engagement by a spanner for rotating the stem to adjust the same and a bolt $c^5$, engages the bifurcated ends of the member for clamping the adjusting stem in place. A stem $C^7$, extends through said adjusting stem $C^6$, and is held in place by nuts threaded on the upper end thereof and a head $c^4$, is provided on the lower end of the stem $C^7$, which is rigidly secured to a carriage $C^8$, movable in ways $C^9$, (see Fig. 8) rigidly secured to the brackets B—B$^1$. Rigidly secured in said carriage by means of a clamping block $C^{10}$, is a die member $C^1$.

Secured upon the bed of the table A, as shown, set into the same is a base $C^2$, having secured thereon a bed plate $C^3$, as shown in Fig. 3, having a laterally directed slot therein of greater width than the maximum dimension of the card to be cut. On said bed plate is the female die member $C^4$, having an aperture therethrough corresponding in size with the size of the ends of the male die member, and increasing in dimension slightly downwardly so that a card having been cut by the die will fall by gravity into the slot in the bed plate and onto the transverse carrier $m^4$, hereinafter more fully described. Means are provided for striking the card out of the male die member, should the same become lodged therein. For this purpose, as shown, a plunger $c^6$, is supported by means of a spring $c^7$, axially in the male die member with the end thereof extending into the recess in the end of the die and secured on the end of said plunger is a flat head $c^8$, which normally presses lightly against the cards during the cutting operation of the die, said spring acting to support said plunger and its head sufficiently high to avoid contact with the stack to be cut until after the cutting operation is completed.

Pivotally engaged on the bracket $B^1$, and extending transversely through the die stem or eccentric rod, is a lever $c^9$, the inner end of which extends above the plunger $c^6$, in position to force the same downwardly and for this purpose, as shown, a rod $c^{10}$, is pivotally engaged on said lever $c^9$, not far from the fulcrum, and at its upper end is adjustably engaged with a laterally directed arm $c^{11}$, secured on said eccentric rod or die stem $c^3$, so that as the male die member reciprocates, said lever $c^9$, acts with each reciprocation to force the stem $c^6$, downwardly, forcing any card out of the male die member that might otherwise have wedged therein.

A stripper $C^{11}$, is provided for releasing the strip of card board from the outside of the die, should the same stick thereto, and is pivoted to an arm $C^{12}$, adjustably secured to the bracket $B^1$ (see Fig. 4) and a rod $C^{13}$, is pivoted at its lower end to the outer end of the stripper $C^{11}$, and at its upper end is pivoted to a lever $y$, which in turn is actuated by a cam Y, on the shaft C. A spring $C^{15}$, bears on the stripper and holds the same in normal position to force the strip from the die as the die elevates but prior to the advancement of the strip the cam Y, actuates the rod $C^{13}$, to elevate the stripper to permit free passage of the strip therebeneath.

Means are provided for supporting a stack of strips of a width equal to one dimension (usually the greatest) of the cards in advance of the die and for feeding the strips one by one to the die and also feeding the stack of strips upwardly at a rate to insure at all times the top of the pack to be in position to feed therefrom a strip to the dies following the strip just fed. For this purpose, as shown, a front frame is provided comprising legs D, constructed of angle bars of any suitable material and connected at the top by means of any suitable structural bar $d$, to each end of which is bolted the side frame members $d^1$—$d^2$, which extend rearwardly and are bolted to the die table. Also rigidly connecting the legs D, near the bottom thereof is a beam $d^3$, of any suitable structural material and bolted thereon and upon a corresponding beam $d^4$, secured upon the front legs of the die table, are horizontal beams or side members $d^5$. Bolted on said side frame members $d^5$, and extending transversely the machine are bars $d^6$—$d^7$. Journaled on said bars centrally thereof, are vertical, threaded shafts E—$E^1$, which, at their upper ends are journaled in straps $d^8$—$d^9$, the former of which is bolted or otherwise secured on the upper transverse frame member $d$, and the latter of which is secured upon a transverse frame member $d^{10}$, suitably secured on said frame members near the rear end thereof. Vertically movable on said threaded shafts, by the rotation thereof, is an elevator table $E^2$. As shown in Fig. 21, sectional nuts threaded complementally with the shafts are engaged on the table and comprise, as shown, an outer section $e$, which is not threaded and engages around the outer side of each shaft or the side remote from the elevator table and is provided with a long tail $e^1$, which is bolted to the table. Slidably engaged on said tail $e^1$, is the tail $e^2$, by means of a set screw $e^5$, extending through a slot in the tail $e^2$, and threaded in the tail $e^1$. The inner threaded nut section $e^3$, is secured on the tail, as shown in Fig. 3. As shown, a strong pulling spring $e^4$, normally holds the threaded nut section in engagement with the respective threaded shaft and a handle $e^{20}$, is secured on the tail of the slidable nut section to permit said section to be manually retracted, when it is desired to quickly adjust the elevator table with its load either upwardly or downwardly. Said spring, however, possesses sufficient tension normally to hold said nut section firmly in gripping relation upon the threaded shaft so that the rotation of said shaft in one direction serves to gradually raise the elevated table, while rotation in the opposite direction would serve to lower the same. Means are provided for rotating said shafts at a rate corresponding with the feed of the cards to the die and operatively connected with the forward feed mechanism for the card strips. For this purpose, as shown, sprocket wheels $e^6$—$e^7$, are secured on said shafts E—$E^1$, respectively and a sprocket wheel $e^8$, is also secured in the same place on the lower end of the driving shaft $E^3$, which is journaled at its lower end on the end of the bar $d^6$, which projects beyond said frame member $d^5$, for that purpose and at its upper end is journaled in a bracket $e^9$, secured on the upper side of the frame member $d^2$. A sprocket chain $c^{10}$, is trained about said sprocket wheels on said respective shafts and about an idler $e^{11}$, journaled on the transverse frame member $d^6$, to bring the lead of the chain from the sprocket wheel $e^8$, to the sprocket wheel $e^6$, within the frame, said drive of necessity causing the screw shafts E—$E^1$, to rotate in the same direction to actuate the elevator table.

Means are provided for driving the shaft $E^3$, from the drive shaft C, which comprises a connecting rod $y^3$, connected at one end to the lever $y$, operated by the cam Y, heretofore described. Said lever is provided with a roller $y^2$, which is held against the cam by a spring $y^1$. The opposite end of said rod is connected to one arm $y^4$, of a bell crank lever pivoted to the frame, the opposite arm $y^5$, of which is connected with a reciprocating rod $y^6$, which is pivoted at its opposite end to an arm $y^7$, pivoted on the shaft $E^3$. A pawl $y^8$, is pivoted to said arm $y^7$, and engages the teeth of a ratchet wheel $y^9$, rigidly engaged on the shaft $E^3$, when the rod is reciprocated in one direction, thereby rotating the shaft $E^3$, which in turn rotates the other shafts E—$E^1$, and thereby raises the table. It is necessary after the stack of strips have been raised to the proper height for the removal of the uppermost that the pawl $y^8$, be thrown out of engagement with the ratchet wheel to prevent further elevation of the table. For this purpose a pin $y^{10}$, is secured to the pawl which is engaged by a pawl $y^{11}$, on a rod $y^{12}$, which is pivoted on the end of a shaft H, and is actuated by an arm $y^{14}$, rigidly secured on the shaft $H^1$. Reciprocation of the shaft $H^1$, forces the arm $y^{14}$, to actuate the rod $y^{12}$, which elevates the pawl $y^8$, to prevent further engagement with the ratchet wheel $y^9$, until the proper time to again elevate the table when the rod $y^{12}$, is returned to normal by gravity.

Secured upon the side frame members $d^1$—$d^2$, is an upper feed frame which is supported at its front end on the transverse bar $d^{10}$, before mentioned. The rear end of the feed frame is adjustably supported on the die table. For this purpose, as shown, a screw jack comprising the nut F, and threaded shaft $f$, provided with a hand wheel $f^1$, is supported on the front side of the die table with said shaft directed vertically and carried on said screw jack is a transverse beam $F^1$, which, as shown, is a T bar having laterally directed flanges in the head thereof beveled under at the edges to positively engage in dovetailed slots in the adjusting blocks $f^2$, which are two in number and adapted to be rigidly but adjustably secured on said beam F, by means of set screws $f^3$, one on each side of the center of the feed table. As shown, a guide bar $f^4$, integral with the beam $F^1$, (see Figs. 3 and 4) at its middle is provided with V shaped angles on each side thereof to fit in corresponding guides $f^5$, secured on the die table and which serve to insure the beam $F^1$, being held at all times horizontal, the construction as a whole enabling the utmost accuracy of vertical adjustment to be secured for said bar or beam.

Supported on inwardly facing brackets $f^6$, on each of the adjusting blocks $f^2$, are light angle bars $f^7$, which at their front end are adjustably secured on the beam $d^{10}$. Said angle bars, owing to the adjustability of the adjusting blocks on the beam $F^1$, may be drawn inwardly toward the center for short cards, or adjusted outwardly for cards of greater size, thus affording a feed chute for cards of any desired width or length. Secured on the top of said adjusting blocks and affording a part thereof, are blocks $f^9$, removably secured on which by a set screw $f^{10}$, is a spring wire lip or tongue $f^{11}$, which is directed inwardly and downwardly for the lip, or the point to bear lightly upon the card strip being fed into the dies, and extending below said block $f^9$, and longitudinally of each of the angle bar guides $f^7$, are cylindric rods $f^{12}$, the forward ends of which extend to receiving position, the rear ends of which extend to near the dies, and act to hold the card lightly down upon the feed chute as the card is fed inwardly and aids in holding said card strip from lifting under the action of the die.

Rigidly connected with the frame is a forwardly projecting ledge or shelf G, on the upper edge of which is a bearing $g$, having pivotally engaged thereon a lever $g^1$, the upper end of which extends above the feed chute and pivotally connected therewith at the upper end is a connecting rod $g^2$, which pivotally engages a detent $g^3$, having a downwardly and rearwardly inclined end, as shown in Figs. 14 and 15, and as shown, is pivoted on a cross head $G^2$, slidable on a guide bar $g^4$, the forward ends of which are connected with the respective adjusting blocks $f^2$, and the rear ends of which extend in close proximity with the dies. The shaft $G^1$, on which said levers $g^1$ are secured is a rock shaft and is operated by means of a lever $g^{10}$, secured on the shaft and projecting rearwardly and the rear end of which is engaged by a crank rod $g^5$, the other end of which is adjustably connected with a disk $g^6$, secured on the main drive shaft. The crank rod $g^5$, for the purpose of varying the throw of the cross head $G^2$, is adjustably secured upon the disk $g^6$. For this purpose, as shown, the disk is provided with a radial slot in which a wrist pin $g^7$, is adjustably engaged, thus by adjusting the wrist pin outwardly a greater amplitude of movement of the crosshead is afforded to feed a larger card and by adjusting the same inwardly a proportionately smaller feed is afforded, thus enabling the travel of the cross head to be adjusted to the desired size of card, and inasmuch as the movement of the cross head is effected by the detent $g^3$, during the feeding movement, the free end of the detent is thrown downwardly to engage the strip sufficiently to slide the same to the dies, as shown in Fig. 14, while during the retracting movement, as shown in Fig. 15, the drive being on said detent, the toe of the same is elevated to let the cross head slide freely back to the forward limit of its movement without retracting the card, this retracting movement of the cross head being accomplished before the die has fully retracted from the card strip.

The forward feed of the card from the stack is primarily effected by a reciprocating mechanism which delivers the strip to rotary feed rolls, which in turn delivers the strip to the reciprocating cross head with the detents before described, said detents and cross heads completing the feeding of the card strip to the die. For this purpose, as shown, a rod H, is secured on suitable standards on the top frame member $d^1$, and extends for approximately the length of, and is opposite to, the elevator table $E^2$. Supported thereon and on the frame of the table by suitable brackets $h$—$h^1$—$h^2$, is a reciprocating rod $H^1$, which is cylindric and is slidable in the bearings in said brackets and means are provided for reciprocating said rod with the rotation of the main driving shaft of the press comprising, first a spur gear $h^3$, secured on the main shaft on the fly wheel end, which meshes with a pinion $h^4$, secured on a stud shaft $h^5$, journaled on the upright bracket member B. Said pinion $h^4$, drives to a spur gear $h^6$, secured on one end of the shaft $h^7$, journaled transversely the frame on the brackets B—$B^1$, of the press. On the opposite end of the shaft $h^7$, is secured a sprocket wheel $h^8$, around which and a larger sprocket wheel $h^9$, journaled upon a stud shaft $h^{10}$, is a sprocket chain $h^{20}$. A pinion $h^{11}$, is secured on said stud shaft $h^{10}$, which meshes with a gear $h^{12}$, which in turn drives to a gear $h^{13}$, secured on a stud shaft $h^{14}$, and which is provided on its outer face with a disk $h^{15}$, provided with a wrist pin $h^{16}$, from which a rod $h^{17}$, connects the same with a suitable connection on the end of the reciprocating rod or bar $H^1$. Said connections are so arranged and the gears set so that the forward reciprocation of the bar or rod $H^1$, begins with the retraction of the male die member and continues until the male die member is about to again engage the card at which time the rearward limit of the stack has been reached, and continued rotation of the driving disk slides said rod $H^1$, forwardly. Secured on said rod at a point at the rear of the middle of the stack of card strips X, is an arm I, which is curved upwardly over the rod H, and as shown, a downwardly projecting arm $i^1$, is rigidly secured on the rod $H^1$. Said arm is provided at its inner end which projects over the card stack, with an integral, vertical sleeve adapted to receive the stem $i^2$, therethrough of a rubber friction pad $i^3$. As shown, said pad being held in a suitable metallic holder $i^4$, with which the stem $i^2$, is integrally connected. As shown also, a set screw $i^5$, is provided to engage said friction pad in adjusted position on said arm. During the rearward movement, or toward the press, of said rod and arm it is important that the friction pad press firmly upon the upper card strip of the stack and during the forward or retracting movement that the pad be elevated above the card strips. A table or plate J, is rigidly bolted in horizontal position on the frame at the forward end thereof and beneath the forward end of said rod $H^1$, and rigidly secured thereon and lying parallel with the side frame member $d^2$, is a short bar $j$. A spring $j^1$, is secured on said side frame member $d^2$, and inclines outwardly and forwardly with the end thereof resting against the outer side of said bar $j$. Pivoted in advance of the end of said bar $j$, is a push bar $j^2$, having a head $j^3$, on the rear end thereof which is held normally against the forward end of said bar $j$, by means of a pulling spring $j^4$, as shown in Fig. 9. Said push bar is provided with an upwardly curved finger $j^5$, which is directed outwardly and toward a bar $j^6$, rigidly secured near the outer lateral margin of the table J. Pivotally engaged at its end midway between the bars $j$ and $j^6$, is a shorter bar $j^7$, the forward end of which is curved outwardly and forwardly to afford between the end of the push bar $j^2$, and the same a rounded or somewhat cylindric seat. Also pivotally engaged at its rear end near the outer margin of the table J, is a bar $j^8$, having a rearwardly and inwardly beveled front end, as shown in Fig. 9, and provided centrally with a pin $j^9$, which extends through a suitable slot in the table to limit the outward swing of the front end of said bar.

Rigidly engaged on the bar $H^1$, is a downwardly directed arm or finger $J^1$, as shown in Figs. 2, 9, and 10. The operation of this portion of our device is as follows: During the forward reciprocation of the bar, the finger $J^1$, engages the rear inclined end of the bar $j^7$, which forces the finger between the bar $j^7$, and the bar $j$ (as shown in Fig. 9 in section), thus slightly rotating the rod $H^1$, and in consequence, lifting the pad. The pad is held elevated until nearly the end of the forward limit of its reciprocation when it engages the seat in the rearwardly directed end of the push pin or bar. Owing to this push pin or bar being set obliquely to the travel of the pin, the same pushes the pin outwardly between the head of the push pin and the forward end of the bar $j^7$, said pin passing between the same. This causes a slight rotation of the bar H¹, which continues until the finger J¹, passes the end of bar $j^7$, permitting said bar returning to normal by means of spring $j^{10}$. When the finger J¹, reaches the bar $j^6$, the pad is firmly pressed upon the stack of cardboard. The rearward reciprocation now begins and said finger passes between bars $j^6$—$j^7$, which firmly holds said pad with downward pressure upon the stack, thus sliding the upper strip on the stack toward the rear, this movement continuing until near the limit of the rearward travel of the rod H¹, the pin engages the inclined end of the bar $j^8$, which is forced outwardly thereby permitting the finger to again pass into the broader passage at the rear of the pivoted bar $j^7$. The pressure of the pad is now released but the pad still exerts sufficient pressure on the next sheet to move the same rearwardly a slight distance, during the beginning of the rearward reciprocation of the shaft H¹. This pressure is released, however, as soon as the finger J¹, engages bar $j^7$, after which the cycle is repeated.

As shown, at the inner end of the feed table is provided a leaf spring K, which curves downwardly and bears upon the upper strip in the stack at all times. It therefore becomes desirable to withdraw the upper strip to permit the rear end of the strip to be free from said spring that the same may rise upwardly over the same when the feeding begins. This is accomplished in the manner just described. This action, of course, does not occur until the strip previously fed has been drawn from beneath said pad by the action of the feed rolls. This preliminary retraction of said strip to be of avail should be retained by suitable means until the next forward movement begins. For this purpose, as shown, an arm K¹, is pivoted on the rod H, before described and projects over the forward end of the stack. At its inner end said arm is provided with a rearwardly directed and upwardly curved arm K², on which is journaled a roller $k^1$, which at all times bears on the surface of the card strips at the outer end to prevent more than one feeding at a time and means are provided for graduating the pressure on the card strips embracing an arm $k^2$, rigidly secured on the shaft H, and extending over the middle of the arm K¹. A milled nut $k^3$, is rotatably engaged in a fork in the inner end of said arm and through a suitable aperture in said end of the arm and through said nut $k^3$, extends a threaded eye bolt $k^4$, which is pivotally engaged at the middle of the arm K¹, thus by means of said nut $k^3$, the pressure of the roll $k^1$, on said stack may be graduated at will. As shown, also, and positively engaged on the inner end of said arm K¹, is a clamp comprising substantially parallel arms $k^6$—$k^7$, the free ends of which are normally held toward each other by means of a set screw $k^8$, one or both said rearward extremities of said arms are slightly beveled to permit the upper strip of the stack to be forced therebeneath by the retraction of the friction pad, said clamp and said roll $k^1$, acting to hold the same until the next forward movement by the friction pad, which exerts sufficient stress on said strip to withdraw the same from the clamp, and from beneath said roll.

The feed rolls to which the strip is delivered by the forward movement of the friction pad before described comprises a lower, larger roll L, secured between the sides $f^7$—$f^7$, of the feed chute, which is secured on a shaft $l$, journaled in suitable brackets $l^1$, on the side frame members $d^1$—$d^2$. On the end of said shaft $l$, is a belt pulley $l^2$, and trained about the same and about a suitable pulley $l^3$, on the main press shaft is a belt $l^4$, whereby said roll is driven continuously. Supported thereon is a weighted roll L¹, the shaft $l^5$, of which extends through, and on opposite sides of the side members $f^7$—$f^7$, of the feed chute and pulleys $l^6$, are secured on the shaft which may or may not be utilized to assist in the feed, as desired.

As the cards are cut by the die they are moved transversely the machine, counted, assembled in packages of a predetermined number and the packages are wrapped or bound in a strip of paper or other suitable material. For the purpose of transferring the cards laterally from the die, parallel rods or bars M, rigidly secured in the sides of the bed of the press extend outwardly therefrom and are connected at their outer ends by means of an adjustable bearing member $m$, engaged on said rods by means of a set screw $m^1$, as shown in Figs. 1 and 5. Journaled in said bearing member is a belt pulley $m^2$. On the opposite side of the bed of the press is likewise supported a belt pulley $m^3$, and as shown in Figs. 3 and 5, a transverse passage is provided beneath the die, and in alinement with the drive of said pulleys $m^2$—$m^3$, and an endless belt or carrier $m^4$, is trained about said pulleys so that the cards cut by the press, as shown in Fig. 5, fall thereon and are transferred thereby to the counting mechanism. As shown also, and to afford a support for the upper run of the belt to a point near the belt pulleys, idler pulleys are provided beneath the lower run of the belt at each end thereof, so that the belt occupies exceedingly small space and is positively supported by the bed of the machine and by the idlers and driving pulleys in horizontal position to near its discharge end. Of course, the belt may be tightened at any time by retracting the set screw $m^1$, and sliding the bearing member $m$, outwardly on the rod M. Said belt is driven continuously. For this purpose a sprocket chain $m^6$, is trained about the sprocket wheel $b^4$, shown in Fig. 3, and thence leads downwardly to a sprocket wheel $m^7$, on a transverse shaft $m^8$, on which, as shown, is a broad belt pulley $m^9$, over which the conveyer belt $m^{10}$, for discharging the selvage or cuttings from the strip, runs. Said shaft $m^8$, projects laterally from the machine and its outer end is supported in a bearing bracket $m^{11}$, which affords a bearing for the shaft $m^8$, and also for a shaft $m^{12}$, at right angles therewith and on which is secured the belt pulley $m^3$, before described, as shown in Fig. 1. Bevel gears $m^{13}$ and $m^{14}$, are secured on said respective shafts $m^8$ and $m^{12}$, and meshing serve to drive said conveyer belt $m^4$, continuously, thus delivering the cards as fast as punched transversely the machine and to the packaging apparatus. Means are provided for counting said cards as they are delivered from said conveyer to the packaging mechanisms, embracing, as shown, a roller $m^{15}$, journaled on the outer end of the bracket on which the belt pulleys $m^3$ and $m^5$, are journaled and journaled on said bracket is a gear $m^{16}$, which meshes with a gear $m^{17}$, on the shaft $m^{12}$, and a gear $m^{18}$, secured on the shaft of the pulley $m^{15}$, so that said shaft $m^{12}$, in driving the belt pulley $m^3$, also drives the pulley $m^{15}$, in the same direction. Said pulleys or rollers $m^3$ and $m^{15}$, are positioned sufficiently close together as to insure the card engaging on the pulley $m^{15}$, before clearing the belt $m^{10}$. Journaled also on a bracket $M^6$, on which said shafts and rollers or pulleys are journaled is a double ratchet wheel comprising relatively thin, flat wheels $n$, and $n^1$, which are riveted together in unvarying relation as shown in Fig. 30, and are provided at their peripheries with equal numbers of oppositely directed fine ratchet teeth, the number of which about the periphery may correspond with the number of cards to be secured in a package. Said ratchet wheel, as shown, is journaled upon a stud shaft N, set in said bracket plate $M^6$, as shown in Fig. 30, and pivotally engaged on said stud shaft N, is a rock bar $N^1$, provided on one end with a spring pawl $n^2$, which engages the teeth on the ratchet $n$, and having pivotally engaged to its opposite end an upwardly directed arm or link $n^3$, which pivotally engages a pawl $n^4$, secured on said bracket plate $M^6$, by means of a pivot pin $n^5$. As shown also, a spring pressed pawl $n^6$, is engaged on the bracket plate $M^6$, and at all times engages the ratchet wheel $n$, and a spring $n^7$, is engaged at the end of said rock bar $N^1$, adjacent the pawl $n^2$, and acts to draw said end of said rock bar downwardly and secured on the bracket plate $M^6$, is a pin or stop $n^8$, which is positioned at the inner side of the pawl $n^2$, so that when said end of the rock bar is drawn downwardly by said spring, said pawl is detached from the ratchet wheel.

Supported above the rollers or pulleys $m^{15}$ and $m^3$ and $m^5$, is a tilting frame $N^2$. This as shown, is pivotally supported on a bracket $n^9$, which extends above the bracket plate $M^6$, and is located approximately above the shaft $m^{12}$, and journaled in the shorter end of said frame $N^2$, is an idle roller $n^{10}$, which at all times rests on the belt $m^4$. The free or laterally directed end of said frame $N^2$, is provided with an idle pulley or roller $n^{11}$, which is positioned directly above the roller $m^{15}$, and normally rests thereon as the roller $n^{10}$, rests on said belt. Brackets $n^{12}$, extend upwardly on each side of said frame and at each end of said roller $n^{11}$, and pivotally engaged thereon is a lever $n^{13}$, the end of which projects past said bracket $n^{12}$, and rests upon the outer extremity of the frame $N^2$, as shown in Figs. 4, 27, and $27^a$. Said lever at its inner end or that adjacent the press is pivotally engaged on a connecting bar $n^{14}$, which extends downwardly and pivotally engages the rock bar $N^1$, adjacent the arm $n^3$. As shown, said connecting rod $n^{14}$, is constructed in two pieces to permit the same to be adjustable as to length to permit the movement of said rock bar to be adjusted accurately to the thickness of the cards passing between the roller $n^{10}$, and belt $m^4$, and roller $m^{15}$, an idle roller $n^{11}$.

As shown, a pin $n^{15}$, is set in the face of the outer ratchet wheel $n^1$, near its periphery in position to engage a lever $n^{16}$, secured on a shaft $n^{17}$, which is journaled in the bracket plate $M^6$. Also rigidly secured on said shaft and projecting upwardly between the bracket plate $M^6$, and the ratchet $n$, is a hooked arm $n^{18}$, adapted to engage over an arm $n^{19}$, and which normally engages said hooked arm $n^{18}$, as shown in Figs. 27 and $27^B$. A pin $n^{20}$ (see Fig. 28) corresponding with the pin $n^{15}$, is secured in the face of the ratchet wheel $n$, near the periphery and acts to press said arm $n^{19}$, downwardly to permit engagement of the hooked arm $n^{18}$, therewith after the same has been once released. Said pin $n^{20}$, is set sufficiently back from the pin $n^{15}$, as to permit the pin $n^{15}$, engaging the arm $n^{16}$, and carrying the same forwardly sufficiently to permit full release of the hooked arm $n^{18}$, before the pin $n^{20}$, engages the arm $n^{19}$, to force the same downwardly sufficiently low to permit the hooked arm $n^{18}$, again engaging over the end thereof.

It is obvious from the construction described that oscillations of the frame $N^2$, act on the lever $n^{13}$, to reciprocate the connecting rod $n^{14}$, thus actuating the rock bar $N^1$, and, inasmuch as the ratchet wheels can rotate in but one direction because of the pawl $n^6$, each reciprocation of said tilting frame acts to shift said ratchet wheel one tooth, thus enabling the number of cards passing beneath the rollers on the tilting frame to be accurately counted by the rotation of said ratchet wheel, and, owing to the arrangement of the pin $n^{15}$, therebeneath the roller $n^{11}$, said pin $n^{15}$, releases the hooked arm momentarily for purposes hereinafter described and for the time being the cards are supported from delivery into the packaging mechanism. A further rotation of said ratchet wheel results (while also counting the cards) in depressing the arm $n^{19}$, sufficiently to permit the hooked arm $n^{18}$, to engage thereover under the action of its springs $n^{22}$, and a stop pin $n^{21}$, limits the return movement of the hooked arm.

Mechanism is provided to receive the counted cards from the counting mechanism and to arrange the same in packages of the counted number and seal the same. For this purpose, as shown, a conveyer is arranged for compactness substantially parallel the main frame of the machine and into which the counted cards are delivered as counted and when the number is completed a shutter is provided to prevent additional cards being delivered into said mechanism until the pack just received has been disposed of. Said conveyer discharges to a receiving chute into which the cards in packages are delivered and in which the same are invested with a wrapping band and from which the packages are delivered securely bound, or arranged together. Said conveyer is supported upon a suitable frame which may be a part of the main frame of the machine or an auxiliary frame constructed in any suitable manner to insure stability, and, as shown, a shaft O, is journaled transversely the main frame at the rear end thereof and is driven with a worm gear $o$, thereon, which is driven by a worm $o^1$, secured on the rear end of the shaft $m^{12}$, as shown in Figs. 23, and 45 to 51 inclusive. Said shaft O, is journaled in the frame for the packaging conveyer and is provided thereon near the rear end of said frame with a sprocket wheel $o^3$, and trained about the same and a sprocket wheel $o^4$, at the front end of said package conveyer, is a sprocket chain $o^5$, as shown more plainly in Figs. 25 and 26. The frame of said package conveyer embraces substantially an elongated trough or box having laterally disposed and longitudinally slotted bottom members $o^6$, and $o^7$, between which the upper lap of the conveyer or sprocket chain runs. Extending upwardly on said bottom members are posts $o^{10}$, as shown one near each end of said lateral bottom members and adjustably secured in each of said posts are transverse arms $o^{11}$, which, at their inner ends are rigidly secured to the adjustable side plates $o^{12}$. This arrangement permits the packaging device to be adjusted for cards of any desired length. Supported at the rear of the bed or table of the packaging device are upwardly directed posts $o^{13}$, and likewise extending therethrough are spring pressed arms $o^{14}$, on the inner ends of which are collecting side members $o^{15}$, the ends of which diverge beyond the rear ends of the side members $o^{12}$, so that said members serve to collect and arrange the cards to bring the ends flush. Said conveyer chain $o^5$, is driven intermittently from the shaft O, from which also the mechanism for sealing the packages is operated, and, as shown, said operation is coincident with the completion of the count by the counting mechanism hereinbefore described. As shown, coacting rollers P and $p$, are journaled one above the other and in contact to operate as feed rollers for the packaging trough, and the lowermost of said rollers P, is driven by means of a belt $p^1$, from a suitable pulley $p^2$, on the shaft $m^{12}$, as shown in Figs. 25 and 28, and as shown, a shutter or stop $p^3$, is arranged to pass between said feed rollers P and $p$, and the collecting and packaging receptacle to prevent cards being delivered into said receptacle until the preceding package has been disposed of. Said shutter $p^3$, is secured on an arm $p^4$, which is secured to a shaft $p^{40}$, pivotally supported on a bracket $p^5$, at one side of the tilting frame for counting the cards. An arm $p^{41}$, is secured to the shaft $p^{40}$, and a connecting rod $p^6$, extends downwardly therefrom and is connected to an arm $p^7$, secured on a shaft $p^8$, on which also is secured the arm or detent $n^{19}$, which is engaged by the hooked arm $n^{18}$. For the purpose of actuating the shaft $p^8$, when the arm $n^9$, is released, said shaft $p^8$, leads rearwardly and through a bracket $O^1$, secured to the side frame of the press. At the rear side of said bracket a lever $p^{10}$, is secured on said shaft $p^8$, and extends above and below the same and to the upper end of said lever is secured a spring $p^{11}$, which acts to shift said upper end of said lever toward the press and consequently the lower end thereof toward the packaging device, and of course actuating shaft $p^8$. Actuation of shaft $p^8$, causes the shutter to descend to prevent the discharge of cards into the chute and to hold the cards received and counted from the press between the rollers P—$p$, until the collecting and packaging mechanism is ready to receive the same. In this construction obviously the reëngagement of the hooked arm with the arm $n^{19}$, acts to instantly elevate the shutter. The release of the arm $n^{10}$, with the resulting actuation of shaft $p^8$, starts the conveyer chain in the packaging trough in operation to afford the drive for substantially all those mechanisms involved in forming the package.

The worm gear $o$, is rotated continuously on the shaft O, and rigidly secured thereto by riveting is a ratchet wheel $o^{18}$, which, of course, also rotates freely upon said shaft. Keyed on said shaft is a driving clutch disk $o^{19}$, on which also is pivotally secured a pawl $o^{20}$, as shown in Fig. 49, and also a spring $o^{21}$, which engages the end of said pawl to press the same into engagement with the ratchet wheel, as shown in Figs. 45 to 49 inclusive. Slidably engaged on the shaft O, as shown in Fig. 48, is a sliding clutch member $o^{41}$, having pins $o^{40}$, set in the face thereof and projecting through complemental apertures in the driving clutch member $o^{19}$, and which, when said sliding member is actuated toward said driving members, project therethrough and engage in notches in the ratchet $o^{18}$, thereby driving the shaft from said worm gear.

Pivotally engaged on the bracket $O^1$, is a shifting lever $p^{12}$, which is connected at its lower end by means of a link $p^{13}$, with the lower end of the lever $p^{10}$, on the shaft $p^8$, and the upper end of lever $p^{12}$, extends into close relation with the periphery of said driving member $o^{19}$, and ratchet wheel $o^{18}$, and is provided with a shoe $p^{14}$, which normally engages said pawl $o^{20}$, to hold the same from engagement with said ratchet wheel, thus preventing said worm gear from driving the shaft O.

Pivotally engaged on the bracket $O^1$, is an upwardly extending yoke lever $p^{15}$, the yoke of which engages in a grooved collar $o^{22}$, on the sliding clutch member $o^{40}$. The lower end of said lever extends below the pivot and is provided with a strong pulling spring $p^{16}$, which acts to shift said lower end toward the press, or in other words, the upper end thereof in a direction to operate the clutch and rigidly engage the worm gear O, with the driving member to rotate the shaft O, thereby.

Journaled below the shaft O, is a rock shaft Q, one end of which is supported on the bracket $O^1$, and the other end of which is supported upon suitable bearings on the frame of the packaging device, as shown in Figs. 23, 50 and 51. Rigidly secured on said shaft Q, at its end adjacent the press is an upwardly directed lever $q$, which extends into position to engage the lower end of the lever $p^{10}$, and as shown, is beveled complementally therewith so that the shifting of said lever $p^{10}$, at the end of the count and due to the release of the arm $n^{10}$, from the counting ratchet wheels permits said lever $q$, to rock forwardly under the action of the spring $q^1$, as shown in Fig. 28, simultaneously with the release of the pawl $o^{20}$, by the shoe $p^{14}$. This partly rotates the shaft Q. Keyed on the end of said shaft Q, adjacent the packaging mechanism is a lever $q^2$, provided at its upper end with an anti-friction roller $q^3$, which tracks on a cam $q^4$, integral with a gear wheel $q^5$, which meshes with a pinion $q^6$, secured on the shaft O, said gear $q^5$, of course beginning to rotate immediately with the rotation of the shaft O, and pinion $q^6$, thereon.

A tubular shaft consisting of two sections slidably engaged together to permit said shaft to shift slightly during its operation, is secured axially on the shaft Q, and indicated as a whole by $Q^1$. Secured on the end thereof adjacent the lever $q$, is a corresponding upwardly directed lever $q^7$, and at the opposite end of said shaft is likewise an upwardly directed lever $q^8$, provided at its upper end with an anti-friction roller $q^9$, which tracks on the periphery of the cam ring $q^{10}$. Secured on said cam ring and integral therewith is a finger $q^{11}$, adapted to engage the lever $q^8$, to force the same rearwardly, and notched to engage in said lever and hold the same in said rearward position, thereby shifting the lever $p^{15}$, against the tension of its spring to disengage the clutch at the end of its cycle of movement. Such shifting of the lever is accomplished because of the coacting inclined face on the lower end of the lever $p^{15}$, and the upper end of the lever $q^7$. The construction is such that the rotation of the shaft is started by the co-action of the lever $p^{10}$ and $p^{12}$, and $q$, which permits the pawl $o^{20}$, to engage the ratchet $o^{18}$. This merely affords the initial movement, inasmuch as the arm $n^{19}$, must be almost immediately thrown downwardly to engage the hooked arm $n^{18}$, on the counting mechanism to permit the counting operation to continue. Said clutch is, therefore, thrown into operation to continue the movement to complete the cycle after the retraction of the lever $p^{12}$, to its normal position. For this purpose, the inner cam ring $q^4$, is cut away on one side to permit the lever $q^2$, to swing forwardly under the action of its spring $q^1$, and is again swung rearwardly when the roller $q^3$, on said lever $q^2$, again engages on said cam ring $q^4$, the inclined faces of said coacting levers $q$—$p^{10}$, again acting to rotate the shaft $p^8$, against the tension of its spring. Said rearward movement of said lever $q^2$, however, acts to release the finger $q^{11}$, from the lever $q^8$, and for the purpose of affording such release a pin $q^{12}$, is set in the lever $q^2$, and projects through a segmental slot in the lever $q^8$, so that the rearward shifting of the lever $q^2$, on engaging its cam ring acts to press the lever $q^8$, sufficiently rearwardly to release said finger. The spring $q^{13}$, secured on the lever $q^7$, as shown in Fig. 23, with reference to the lever $q$, permits the shaft to rock to swing the levers forwardly, thus releasing the yoke lever $p^{15}$, and permits the spring $p^{16}$, thereof to slide the clutch member $o^{22}$, to engage the ratchet wheel $o^{18}$, to drive the shaft thereby. This cycle of operation is, of course, repeated so far as the drive of the shaft O, is concerned and the gear $q^5$, having rotated once, the finger $q^{11}$, again throws the lever $q^8$, rearwardly releasing the clutch preparatory to repeating the operation. In as much as the driving sprocket wheel for the packaging conveyer chain is rigidly secured on the same shaft with the pinion $q^6$, it follows that the chain is driven intermittently and only when the shaft O, is actuated. Pivotally secured on said chain to afford equal spaces between the same are follower blocks R—R$^1$. These are pivoted at their bottom centrally each on a link in said chain and are arranged so that on the upper run of said chain they face rearwardly, as indicated by the follower block R$^1$, in Fig. 26. Extending upwardly through the slots in the bed in each side of the chain are arms R$^2$. These, as shown in Fig. 35, are integrally connected together below the table and are secured on a shifting rail $r$, which is slidably supported on ways $r^1$, on each side thereof and beneath the table and which, as shown, extends rearwardly and substantially horizontal to near the rear end of the packaging receptacle or trough at which point said ways bend abruptly downward. Integrally connected with said arms R$^2$, and at a suitable angle therewith to hold said arms R$^2$, vertically when in supported position, are rearwardly directed arms $r^3$, each of which is provided on the outer side thereof at its extremity with a roller $r^{20}$ (see Fig. 34) which tracks on the ways so that as said arms are shifted on said ways with the shifting bar $r$, on which the arms are pivoted, the arms R$^2$, will maintain an upright position until said rollers reach the downwardly directed portion of said ways at which point they fall rearwardly to permit the passage of the package of cards past the same. As shown, a pulling spring $r^4$, is engaged on said shifting bar and acts to return and hold the same at the forward limit of its movement with the arms R$^2$, in upright position. As shown, means are provided to hold said shifting bar at the rearward limit of its movement until the package of cards has passed over the same. For this purpose, as shown, a transverse arm $r^5$, is provided on the under side of said shifting bar and pivotally engaged upon a part of the frame of the machine is a lever $r^6$, which, at its upper end, pivotally engages a hooked lever $r^7$. A spring $r^8$, engages the rearwardly directed end of said hooked lever $r^7$, with the lever $r^6$, as shown in Fig. 24, and a segment shaped cam $r^9$, is secured to rotate with a gear $r^{10}$, driven from the gear $q^5$, said cam, as shown in Figs. 33 and 34, acting to engage a suitable roller at the lower end of the lever $r^6$, to carry said hooked lever $r^7$, rearwardly, in which event said spring $r^8$, elevates the forward end of said lever to engage the arm $r^5$, on the shifting bar, thereby holding said shifting bar in its rearward position until said gear and cam have rotated a sufficient distance to release said lever, said distance being timed to insure the passage of the pack of cards past the arms $r^2$, as shown in Fig. 33.

Means are provided to assist in collecting the cards in a pack of the desired number at the forward end of the packing trough. For this purpose, the end of the shaft O, on the outer side of the packaging trough is provided with a pinion S, and journaled on a suitable stud shaft S$^1$, secured on the frame is a gear $s$, which meshes with said pinion and is provided on its inner side with a cam, shown in dotted lines in Fig. 52, and partly in full lines in Fig. 26, and indicated by $s^2$. Supported upon a pivot pin $s^3$, on the side of the frame is a lever $s^1$, the rear end of which projects over said cam. The rear end of said lever is provided with a strong pulling spring $s^5$. Said lever projects forwardly alongside the packaging trough and extends through a slot in a guide bar S$^6$, and at its forward end is provided with a laterally directed spring arm or plate $s^6$, which extends over the trough opposite the feed rolls P and $p$, and on which are secured downwardly directed spring arms $s^7$ and $s^8$, which extend transversely the trough on each side of said stop or shutter $p^3$, and between which the cards as counted are delivered, one upon another until the desired number to afford the pack are in place and at which time the arm $n^{19}$, is released to start the conveying and packaging operation of the pack. A guard and guide S$^{11}$, is secured on the plate $s^6$, and guides the cards into the trough. The gear $s$, and cam $s^2$, are timed from the shaft so that at the moment of the release of the arm $n^{19}$, and upon the completion of the count, the roller $s^4$, on said lever $s^1$, passes into a recess in said cam, permitting the action of the spring $s^5$, to throw the forward end of the lever $s^1$, upwardly to release the pack therefrom, as the follower block R or R$^1$, approaches the same. Said recess or throw in said cam is of sufficient extent to hold the forward end of said lever elevated until the follower block has passed therebeneath, moving the pack of counted cards therethrough toward the arms R$^2$, and immediately upon the reëngagement of the arm $n^{19}$, with the hook arm $n^{18}$, said forward end of the lever descends to again retain the cards counted into the trough from movement until the next approach of a follower block. A safety device is provided to prevent premature or accidental elevation of the spring arms $s^7$—$s^8$, which comprises a lever $S^7$, pivoted to the guide bar $S^6$, which is notched at its upper end to engage over the lever $s^1$. Said lever $S^7$, is adjustably connected with a bar $S^8$, which is connected to an arm $S^9$, secured on the shaft $n^{17}$, and consequently at the completion of the count the lever $S^7$, is released from the lever $s^1$. Said pack is moved against said arms $R^2$, and the pressure thereagainst serves to even or adjust said cards laterally with respect to each other while, of course, the spring side members $o^{15}$, for the packaging trough, act to even or adjust the same longitudinally of the cards and the pack is thus delivered to the wrapping and sealing mechanism at the rear end of said trough. Said wrapping and sealing mechanism comprises a substantially vertical chute T, having spring sides $t^2$, which are adjustable in any suitable or convenient manner to permit the same chute to be utilized for cards of different lengths and the rear of said chute is formed by a plate $T^{20}$, which is supported by a lever $T^{21}$, pivoted to the upper end of the chute and a spring $T^{22}$, bears against said lever and yieldingly holds the plate in place but permits the plate yielding to accommodate different widths of cards. As shown, arms $t$, extend downwardly and rearwardly from the frame of the packaging trough and at the lower end thereof, as shown, approximately vertically below the discharge end of said trough are pivotally engaged with downwardly directed arms $t^1$, of said chute, which, as shown in Figs. 23, 24, 39 and 40, are integral with the side members of said sealing chute. Said chute is provided with rear and front walls, as before described, which may (as well as the side walls) be lined with spring plates $t^2$, the upper ends of which are slotted and bent over the top of the chute and are adjustably secured in position by means of screws $t^{20}$, as shown in Figs. 25 and 38, to exert a sufficient resistance upon the packs when delivered thereinto, to retain the same until forced downwardly by succeeding packs delivered thereon from above.

Above the packaging trough on a shaft or bar $T^1$, secured on the frame of a press is a paper carrying wheel $t^3$, of sufficient size to carry a supply of wrapping paper sufficient to supply the material for wrapping the packs for a considerable period of time. Mounted upon a standard or bracket $t^4$, at the rear end of the packaging trough are feed rollers $t^5$ and $t^6$, of which the larger feed roll $t^5$, is secured on a shaft $t^7$, and on which also is secured a pinion $t^8$, which is rigidly secured on the shaft by means of a pawl $t^9$, and ratchet $t^{10}$, to rotate said roller only in one direction, that is to say, when feeding the paper strip from the wheel $t^3$, downwardly between said feed rollers, said pawl and ratchet permitting said pinion to rotate freely on said shaft in the opposite direction. Meshing with said pinion is a rack bar $T^2$, which, on the forward side of the pinion is provided with a metallic strap or loop $t^{11}$, on the outer side thereof, which normally slides on a flanged collar $t^{12}$, secured on said shaft $t^7$, at its extremity and beyond the pinion.

Secured on the rear end frame of the packaging or conveying trough is a downwardly and rearwardly directed rack bar $T^3$, the teeth of which are directed upwardly and meshing thereon is a pinion $t^{13}$, having a slotted arm $t^{14}$, riveted or otherwise rigidly secured thereon, and with which the lower end of the rack bar $T^2$, is rigidly but adjustably engaged by means of a pin $t^{15}$, extending therethrough. Pivotally secured on the opposite side of said pinion, as shown in Figs. 23, 24 and 39, is a curved link U, the upper end of which is pivotally engaged on a sliding shaft $u$, secured on one side of the chute and the upper end of which is provided with a laterally directed arm $u^1$, which projects over said chute and on which is secured an automatic paste pot $U^1$. Said connection between said paste pot and said pinion is such that when the chute swings outwardly, as shown in Figs. 39 and 40, rotating the pinion on the curved rack teeth $T^{13}$, the paste pot is drawn downwardly to paste the label as hereinafter more fully described and at the same time the rack bar $T^2$, is drawn downwardly to the limit of its movement, without rotating the paper and feed rolls preparatory to rotating the said rolls in feeding the paper downwardly when said chute is swung back to position against the end of the package conveyer or trough. Means are provided for shifting or swinging said chute outwardly to the position shown in Figs. 39 and 40, to afford the function mentioned and as well to provide a space between the end of the package conveyer or trough sufficient to permit the follower block to pass around the rear sprocket wheel. For this purpose, a bell crank V, is pivoted beneath the rear end of the table with the shorter arm $v$, directed over the shaft $Q^3$, upon which the gear $g^5$, and cam wheel $q^4$, is secured, and rigidly secured on said shaft is a cam having an inwardly directed finger $v^3$, as shown in Figs. 24 and 39. Said finger engages at the proper moment an antifriction roller $v^4$, on the shorter arm of said bell crank, as shown in Fig. 39, and elevating the same, throwing the downwardly directed and longer arm $v^5$, rearwardly. This, as shown, is connected with the sealing chute by means of a link $v^6$, pivotally connected with each so that with each rotation of the gear $q^5$, and the cams connected therewith, said sealing chute is rocked rearwardly from the end of the package conveyer. Said cam $v^3$, is secured upon said shaft $Q^3$, to exactly time said rearward swing of said chute to succeed the delivering of each package thereinto. For the purpose of preventing too sudden motion of the chute forwardly, a pneumatic cylinder $v^7$, is secured to the frame, in which is secured a piston $v^9$, and a connecting rod $v^8$, connects the piston with chute T. As shown, the forward swing of said chute and the consequent forward rotation of the pinion $t^{13}$, acts to thrust the rock bar $T^2$, upwardly, rotating the feed roll $t^5$, to feed the end of the sealing strip downwardly through a suitable guide $t^{16}$, between the sealing chute and the rear end of the package conveyer as shown in Figs. 26 and 53, in position for the next succeeding pack when delivered into the chute, to carry a loop of said wrapping paper W, therewith, and also the severed end of the wrapper for the preceding package, as shown in Figs. 53 and 54, to press said end downwardly on the other previously pasted end of the wrapper for the preceding package. As shown, the strip is cut by a knife secured on the forward edge of the paste can $U^1$, said strip being severed at a point to afford a sufficient overlap, and, as shown, a spring latch $w^1$, is secured on the rear side of the sealing chute and is projected inwardly with the retraction of the sealing can to hold the pasted end of the sealing wrapper downwardly on the pack until the free end of the sealing wrapper is folded inwardly thereon with the next succeeding pack.

Any suitable bottom discharge paste can may be employed. We have shown in Fig. 44, a cylindric paste can having a spring impelled plunger $u^2$, opening through the bottom thereof, which, when pressed upwardly by pressure on the wrapper, permits a sufficient amount of the paste to exude from the bottom of the can.

The operation is as follows: The material cut in strips a very little wider than one of the dimensions of the desired card is adjusted in a suitable stack X, in the automatic feed table for the press, and is fed upwardly by mechanism hereinbefore described, at a rate corresponding with the delivery of the strip from the top of the pack to the press. Said strips are automatically fed through the press beneath the die which is operated at high speed and the cards punched therefrom, dropped from the die onto the carrier belt $m^4$, whereby they are delivered as cut, laterally to the counting mechanism while the selvage is delivered from the rear of the press upon the conveyer belt to discharge the same from the machine. Said conveyer belt is driven at such a rate of speed with reference to the operation of the die as to afford an interval or space between adjacent cards thereon. In consequence, as the cards pass beneath the rollers $n^{10}$ and $n^{11}$, the tilting frame $N^2$, is oscillated sufficiently to actuate the rock bar $N^1$, each oscillation thereof being exaggerated owing to the relatively long throw of the lever $n^{13}$, and in any event, being sufficient to rotate the compound ratchet wheel one notch for each card passing the roller $n^{11}$. This continues until the counting device formed by the connected ratchet wheel $n$—$n^1$, has completed one revolution, rotating one notch for each card passing to the package conveyer. When the desired number of cards have passed corresponding with the number of teeth on said ratchet wheels, the pin $n^{15}$, comes into engagement with the lever $n^{16}$, retracting the same sufficiently to release the arm $n^{10}$, on the shaft $p^8$. This immediately drops the shutter or stop $p^3$, to prevent the next succeeding card delivering into the package conveyer or trough, and, owing to the connection of said lever $p^{10}$, with the shaft $p^8$, retracts the shoe $p^{14}$, from the pawl $o^{20}$, permitting the same to engage the ratchet wheel $o^{18}$, on the driver $o$, and in consequence rotating the shaft O, and gear $q^5$, sufficiently to release the lever $q^8$, permitting the same to fall inwardly on the cam ring $q^{10}$, engaging the sliding clutch member with the worm gear $q$, and thus driving the package conveyer, the sealing mechanism, and, in fact, actuating all that portion of the machine functioning after the counting of the cards. Immediately with the engagement of said clutch member with the worm gear, the lever $q^2$, engaging upon the mutilated cam ring $q^4$, is thrown rearwardly, thereby forcing the lower end of the lever $p^{10}$, laterally and throwing the arm $n^{10}$, downwardly to again permit the arm $n^{18}$, to engage the same. This movement obviously results in permitting such cards as may have accumulated on the feed rollers P and $p$, to be delivered into the conveyer between the spring arms $s^7$ and $s^8$, on the lever $s^1$, which retains the same from movement in the conveyer until the next release of the arm $n^{19}$, at the completion of the count, at which moment the gear S, and cam $s^2$, are in position to permit the forward end of said lever to be elevated sufficiently for the follower block to pass therebeneath carrying the completed pack therewith, and toward the arms $R^2$. Said forward end of the lever again descends to receive the first cards of the next succeeding pack, while the follower block forces said pack against the arms $R^2$, and sliding the same between the lateral walls of the trough, bring the same to afford a uniform pack. Said block forces said arms rearwardly along the ways until the shorter arms $r^3$, thereon pass into the downward bend on said ways, permitting said arms to rock backward and the pack and follower block to pass thereover and during such passage the cam $r^9$, has engaged the lever $r^6$, to throw the hooked arm $r^7$, upwardly to hold the shifting rail $r$, from forward movement, and, of course, to prevent said arms $R^2$, throwing upwardly to disarrange the cards in the pack. At the moment of delivery of the pack to the sealing chute the side of the pack is carried against the wrapping strip W, a sufficient length of which has been fed downwardly between the chute and the end of the conveyer for that purpose, and a loop of said wrapper is carried with the pack into said chute, as shown in Fig. 54, a sufficient length of said wrapper extending upwardly above the pack to permit sealing. At the moment of discharge of the pack into the chute, the cam $r^3$, engages the shorter arm of the bell crank V, throwing the chute rearwardly, as shown in Fig. 39, drawing the rack bar $T^2$, downwardly, drawing the paste pot $U^1$, down upon the wrapper, pasting the rear end thereof and severing the wrapping strip between the middle of the pack and the forward edge thereof. This rearward movement of the chute is accomplished quickly and permits the follower block passing around the sprocket wheel for the conveyer chain, and this, having been accomplished, the chute rocks forwardly, forcing the rock bar upwardly and in consequence, feeding down a strip of the wrapper sufficient for the next succeeding pack. In this manner the operation is continuous and exceedingly rapid, the cards being cut from the strip, counted, assembled, invested with a wrapping strip in packs of uniform number and dimension, and the packs stacked one upon another in the chute, each succeeding pack holding the fold of the wrapper for the pack preceding the same into the chute, and said packs remaining a sufficient length of time in the chute to permit the quick drying paste to set somewhat. From the sealing chute, the cards may be delivered in any suitable manner. We have shown a conveyer belt Y, passing around a pulley $Y^1$, which is secured on a shaft $Y^2$, operated by a cable $Y^3$, trained around pulleys $Y^4$, and $Y^5$, on shafts $Y^2$ and $m^8$ respectively.

We have described but one of many possible constructions embodying our invention, and we are well aware that the mechanical elements entering into the construction may be varied through an exceedingly wide range, but, inasmuch as numerous such modifications and variations will readily suggest themselves, we purpose claiming broadly a machine capable of receiving stock in bulk and automatically feeding the same to a cutting die, automatically counting the product, assembling the counted product in packs of uniform size and wrapping and sealing said packs. We therefore do not purpose limiting this application for patent otherwise than necessitated by the prior art.

We claim as our invention:

1. A machine of the class described embracing cutting mechanism, mechanism for automatically feeding the stock thereto, mechanism for counting the product, for receiving and stacking the product, mechanism for elevating said member, means for removing the stacked product when said member is elevated, and mechanism for binding the product in packs.

2. A machine of the class described embracing a cutting mechanism, a counting mechanism, a member for assembling the counted product in stacks of uniform number, mechanism for elevating said member, means for removing the stacked product when said member is elevated, and automatic means for wrapping the stacked product in packs.

3. In a machine of the class described a card cutting die, mechanism for automatically feeding the stock thereto from a bulk supply, a counting mechanism for the cards, means operated from the counting mechanism for assembling the cards in stacks of uniform number, a chute for receiving the stacked cards, means for delivering a strip of binding material in front of the chute, means for delivering the stacked cards to the chute, and a wrapping mechanism for wrapping the stacks in separate packs while in said chute.

4. In a machine of the class described a card cutting machine, mechanism for counting the cards as cut, mechanism controlled by the counting mechanism for assembling the cards in stacks of uniform number, a chute for receiving the stacked cards, means for delivering a strip of binding material in front of the chute, means for delivering the stacked cards to the chute, and mechanism for wrapping said stacks in separate packs.

5. A machine of the class described embracing a cutting mechanism, a wrapping mechanism, an automatic feed mechanism for elevating a bulk supply of card stock, and discharging the same sheet by sheet to the cutting mechanism, mechanism for counting the cards as cut, intermittently operating mechanism acting to assemble the counted cards in stacks of uniform number, mechanism for conveying each stack of cards to the wrapping mechanism comprising coacting movable members for engaging the pack therebetween, mechanism for releasing one of said members to permit the stack passing into the wrapping mechanism and means for automatically returning said member to normal after passage of the stack.

6. In a machine of the class described a card cutting mechanism for card stock, means for feeding the stock to the cutting mechanism, mechanism operating to elevate the stock at a rate commensurate with the discharge of the stock, mechanism for counting the product, mechanism for assembling the counted product in stacks, means removing the cards when the desired number have been stacked, a chute for receiving the stacked cards, mechanism engaging a band around the stacked cards while in the chute, and combined cutting and pasting means for the wrapping strip.

7. A machine of the class described embracing a cutting machine, means for feeding the stock thereto, a conveyer for delivering the cut product from the cutting machine, automatic means for counting the same on the conveyer, a member for assembling the counted product in stacks, mechanism controlled by the counting means for elevating said member, means removing a stack of cards each time that the member is elevated, and a wrapping mechanism acting to receive the stacks and discharge the same from the machine in wrapped packages.

8. In a machine of the class described a supporting table for a stack of strips, a reciprocating die, mechanism for removing the card strips from the stack, mechanism for intermittently advancing the card strip beneath the die, a member for receiving and stacking the cards, mechanism for removing said stack of cards, a vertical chute adapted to receive the stacked cards, adjustable spring sides within the chute to permit the chute to be used for stacked cards of various lengths, and mechanism wrapping a band around the stacked cards while in the chute.

9. A machine of the class described embracing in combination with a feeding and cutting mechanism, and mechanism for counting the product, of a receptacle for assembling the product in stacks of a uniform number, mechanism for elevating said receptacle, means removing a stack of cards each time that the receptacle is elevated, an intermittently acting conveyer controlled from the counting mechanism and a wrapping mechanism acting to receive the stacks from the conveyer and discharge the same from the machine in wrapped packages.

10. A machine of the class described embracing a counting mechanism for the product of the machine, mechanism for assembling said product in stacks of uniform size, mechanism for elevating said assembling mechanism, means removing a stack of cards each time that said mechanism is elevated, wrapping mechanism adapted to receive the stacks when assembled, means feeding a wrapping strip thereto in advance of the stack and combined cutting and pasting means for the wrapping strip.

11. In a machine of the class described a wrapping mechanism embracing an upright chute, adjustable and resilient inner walls therefor, mechanism acting to feed a wrapping strip in advance of said chute, means acting to deliver the product to be wrapped in packages of a uniform number against said wrapping strip and into the chute with the wrapping strip investing three sides thereof and projecting upwardly at each end, a reciprocating pasting mechanism adapted to moisten the wrapper with paste, a cutter on said pasting means for severing the strip, the succeeding superposed package acting to paste the otherwise free end of the wrapping strip upon said pasting portion.

12. A machine of the class described embracing a combined cutting, feeding and counting means, a member assembling the cut and counted product in stacks of a uniform number, mechanism for elevating said member, means removing a stack of cards each time that the member is elevated, and mechanism for wrapping said stacks in uniform packages having flush sides and ends.

13. In a machine of the class described, mechanism for cutting cards, mechanism for feeding strips to the cutting mechanism, mechanism for counting the cards, mechanism for stacking the cards, a substantially vertical chute for receiving the stacked cards, adjustable spring sides within the chute to permit the same to be used for cards of different lengths, a plate adapted to form the rear of said chute, a lever supporting the plate and pivoted to the upper end of the chute and adapted to permit the plate yielding to accommodate different widths of cards, and a wrapping mechanism for wrapping the stacks in separate packages while in the chute.

14. A card cutting machine of the class described embracing a die, automatic means for feeding the stock thereto, a continuously driven carrier for removing the cards as cut laterally of the machine, a counting mechanism associated with said carrier for counting the cut cards, mechanism controlled thereby for assembling the cards in stacks of a uniform number, a reciprocating chute for receiving the stacked cards, means for delivering a strip for binding material in front of the chute, and means for delivering the stack of cards to the chute and wrapping the binding material partly around the same.

15. In a machine of the class described a supporting table for a stack of strips, a reciprocating die, mechanism for removing the card strips singly from the pack, mechanism for intermittently advancing the card strip beneath the die, a member for receiving and stacking the cards cut, mechanism for elevating said member and means for removing said stack of cards when the member is elevated.

16. In a machine of the class described a supporting table for a stack of strips, a reciprocating die, mechanism for removing the card strips singly from the pack, mechanism for intermittently advancing the card strip beneath the die, a counting mechanism for the cards, means for receiving and stacking the cards as counted, mechanism for wrapping each stack of cards, means for removing the stack of cards from the receiving means and delivering the same to the wrapping mechanism, mechanism for temporarily arresting the delivery of the cards from the counting mechanism after each stack has been formed, and mechanism for releasing said arresting mechanism after the stack of cards has been removed and before completion of the wrapping operation.

17. In a machine of the class described a supporting table for a stack of strips, a reciprocating die, mechanism for removing the card strips singly from the pack, mechanism for intermittently advancing the card strip beneath the die, a counting mechanism for the cards, a receptacle for receiving and stacking the cards as counted, mechanism for wrapping each stack of cards, mechanism for elevating said stacking receptacle, means for removing the stack of cards from the stacking receptacle while elevated and delivering the same to the wrapping mechanism and mechanism for preventing the cards from leaving the counting mechanism during removal of a stack from the receiving means.

18. In a machine of the class described a table for supporting a stack of strips, means for removing the top strip from the pack, mechanism for raising the table into position for the next succeeding strip to be removed, a die, feed mechanism for delivering the strip to the die, a conveyer for removing the cut cards from beneath the die, counting mechanism for the cards, a member adapted to receive and stack the cards, a chute for receiving the stacked cards, mechanism engaging a band around the stacked cards while in the chute and combined cutting and pasting means for the wrapping strip.

19. In a machine of the class described a table for supporting a stack of strips, means for removing the top strip from the pack, mechanism for raising the table into position for the next succeeding strip to be removed, a die, feed mechanism for delivering the strip to the die, a conveyer for removing the cut cards from beneath the die, counting mechanism for the cards adapted to count predetermined numbers of said cards, a member for receiving and stacking the cards, means for preventing further counting of the cards, means for elevating said receiving member, means for removing the stack of counted cards when the receiving member is elevated, and mechanism for receiving said stack to wrap the same.

20. In a machine of the class described mechanism for cutting cards, mechanism for stacking the cards in stacks of a predetermined number, a reciprocating chute for receiving the stacked cards, means for delivering a strip of binding material in front of the chute and means for delivering the stacked cards to the chute and wrapping and pasting the material around the stacks.

21. In a machine of the class described mechanism for cutting cards, mechanism for feeding strips to the cutting mechanism, mechanism for counting the cards, mechanism for stacking the cards, mechanism for wrapping the cards, mechanism for temporarily arresting delivery of cards to the stacking mechanism after a stack of the required number has been formed, and mechanism for elevating said arresting mechanism after the stack of cards have been removed and before completion of the wrapping operation.

22. In a machine of the class described mechanism for cutting cards, mechanism for feeding strips to the cutting mechanism, mechanism for counting the cards, mechanism for stacking the cards, mechanism for preventing delivery of cards to the stacking mechanism after a stack of the required number has been formed, a chute for receiving the stack of cards, means for delivering a strip of binding material in front of the chute and means for delivering the stack of cards to the chute and wrapping the binding material partly around the stack of cards.

23. In a machine of the class described mechanism for automatically and successively feeding strips of material, mechanism for cutting said strips into cards, mechanism for automatically counting the cards, mechanism for arranging the cards in stacks, a reciprocating chute for receiving the stacked cards, means for delivering a strip of binding material in front of the chute and means for delivering the stacked cards to the chute and wrapping the binding material around the stacked cards.

24. In a machine of the class described mechanism for automatically and successively feeding strips of material, mechanism for cutting cards therefrom, mechanism for automatically counting the cards, a member for receiving and arranging the cards in stacks, mechanism for elevating said receiving member, mechanism for temporarily arresting delivery of the cards from the counting mechanism after each stack has been formed, means for removing the stacked cards from the receiving member when the receiving member is elevated, and mechanism for wrapping each stack of cards after it has been removed from the receiving member.

25. In a machine of the class described mechanism for automatically and successively feeding strips of material, mechanism for cutting cards therefrom, mechanism for automatically counting the cards, mechanism for arranging the cards in packs, mechanism for wrapping each pack of cards, mechanism for temporarily arresting delivery of the cards from the counting mechanism after each stack has been formed, and mechanism for releasing said arresting mechanism after the stack of cards have been removed and before completion of the wrapping operation.

26. In a device of the class described mechanism for cutting strips of cardboard into cards of uniform size, means for counting the cards, means for receiving and stacking the cards, mechanism for evening up the stacked cards, a chute adapted to receive the stacked cards, mechanism for engaging a band around the stacked cards while in the chute and means for delivering paste to paste the ends of the band together.

27. In a machine of the class described a supporting table, a card cutting mechanism, means for successively feeding strips from the table to the cutting mechanism, a member for receiving and stacking the cut cards, means for regulating the number of cards for each stack, mechanism for elevating the receiving member when the stack is formed, means for removing the stacked cards when the receiving member is elevated and mechanism for wrapping a band around the stacks of cards to form packages.

28. In a machine of the class described a supporting table, a card cutting mechanism, means for successively feeding strips from the table to the cutting mechanism, mechanism for stacking the cut cards, means for regulating the number of cards for each pack, mechanism for wrapping a band around the pack of cards, mechanism for conveying each pack of cards to the wrapping mechanism comprising coacting movable members for engaging the pack therebetween, mechanism for releasing one of said members to permit the pack passing into the wrapping mechanism and means for automatically returning said member to normal after passage of the pack 29. In a machine of the class described a vertically movable table for supporting a stack of strips, mechanism for singly elevating the strip from said stack, mechanism for cutting cards from the strips, a conveyer for continuously removing the cards and a conveyer for removing the selvage, a member for receiving and stacking said cards, mechanism for elevating said member, and means for removing said stack of cards when said member is elevated.

30. In a machine of the class described a vertically movable table for supporting a stack of strips, mechanism for singly elevating the strips from said stack, mechanism for cutting cards from the strips, a conveyer for continuously removing the cards, a conveyer for removing the selvage, a counting mechanism for the cards, a member for receiving and stacking the cards, mechanism for elevating said member, and means for removing the stack of cards when said member is elevated.

31. In a machine of the class described a vertically movable table for supporting a stack of strips, mechanism for singly elevating the strip from said stack, mechanism for cutting cards from the strips, a conveyer for continuously removing the cards, a conveyer for removing the selvage, a counting mechanism for the cards, a member for receiving and stacking the cards, mechanism for elevating said member, means for removing the stack of cards when said member is elevated, mechanism for receiving the stack of cards therefrom and for wrapping a band around each stack and means for delivering paste to the band.

32. In a device of the class described a cutting mechanism, mechanism for containing a stack of strips and delivering strips singly and successively from the stack to the cutting mechanism, a continuously moving conveyer for moving the cut cards from the cutting mechanism, a member for receiving and stacking the cards, mechanism for elevating said member, and means for removing the stack of cards when said member is elevated.

33. In a device of the class described a cutting mechanism, mechanism for containing a stack of strips and delivering strips singly and successively from the stack to the cutting mechanism, a continuously moving conveyer for moving the cut cards from the cutting mechanism, mechanism for counting the cards, a stacking member for receiving the counted cards from the conveyer, mechanism for elevating said member, means for removing the stack of cards when said member is elevated, a conveying mechanism for the stacks of cards and mechanism for wrapping each stack of cards.

34. In a machine of the class described a wrapping mechanism embracing an upright reciprocatable chute, adjustable and resilient inner walls therefor, mechanism acting to feed a wrapping strip in advance of said chute, means acting to deliver the product to be wrapped in packages, against said wrapping strip and into the chute, means for reciprocating said chute and combined cutting and pasting means for wrapping the stacks in packages while in the chute.

35. In a machine of the class described a combined cutting, feeding and counting means, a member assembling the cut and counted product in stacks, a wrapping mechanism embracing a vertical reciprocatable chute, adjustable inner walls therefor, mechanism acting to deliver the stacked cards to the chute, mechanism acting to feed a wrapping strip in advance of said chute, and mechanism engaging the wrapping strip around the stacked cards.

36. In a device of the class described mechanism for cutting strips of cardboard into cards of uniform size, means for counting the cards, means for receiving and stacking the cards, wrapping mechanism embracing an upright reciprocatable chute, resilient inner walls therefor, means delivering the stacked cards to the chute and against the wrapping strip, and a reciprocating mechanism adapted to simultaneously cut the wrapping strip and moisten the same with paste.

37. In a device of the class described mechanism for cutting cards, mechanism for feeding strips to the cutting mechanism, mechanism for counting the cards, a member for assembling the counted product in stacks, mechanism for elevating said member, means removing a stack of cards each time that the member is elevated, wrapping mechanism adapted to receive the stacked cards, embracing a vertical chute, adjustable resilient inner walls therefor, mechanism acting to feed a wrapping strip in advance of the chute, means delivering the stacked cards to the chute, and a reciprocating pasting and cutting mechanism adapted to simultaneously cut the strip and moisten the end thereof, the succeeding superposed package acting to press the free end of the strip upon the moistened portion.

38. In a device of the class described a combined cutting, counting and feeding means, a member assembling the cut and counted product in stacks of uniform number, a chute for receiving the stacked cards, adjustable resilient spring sides within the chute to permit the same to receive cards of different lengths, a yieldable plate adapted to form the rear end of said chute and permit the chute to receive stacks of cards of different widths, means delivering a wrapping strip in front of the chute, means delivering stacked cards to the chute and against the wrapping strip, and a reciprocating cutting and pasting mechanism adapted to simultaneously cut the wrapping strip and moisten the same with paste.

39. In a machine of the class described mechanism for automatically and successively feeding strips of material, mechanism for cutting cards therefrom, mechanism for automatically counting the cards, mechanism for arranging the cards in stacks, means adapted to elevate said stack arranging mechanism, means for removing the stacked cards when the arranging mechanism is elevated, a reciprocating chute adjustable to receive stacked cards of various dimensions, means for wrapping a strip around each stack while in the chute, and a reciprocating cutting and pasting mechanism adapted to simultaneously cut the wrapping strip and moisten the same with paste.

In testimony whereof we have hereunto subscribed our names in the presence of two subscribing witnesses.

JOHN N. KANE.
GEORGE C. BAUMAN.

Witnesses:
C. W. HILLS,
J. W. ANGELL.